United States Patent

Shigenobu et al.

[11] Patent Number: 5,917,792
[45] Date of Patent: Jun. 29, 1999

[54] RECORDING MEDIUM, RECORDING MEDIUM PLAYBACK DEVICE, RECORDING MEDIUM PLAYBACK METHOD, RECORDING MEDIUM RECORDING DEVICE AND RECORDING MEDIUM RECORDING METHOD

[75] Inventors: Masahiro Shigenobu; Kensuke Fujimoto, both of Kanagawa, Japan

[73] Assignee: Sony Corporation, Tokyo, Japan

[21] Appl. No.: 08/886,343

[22] Filed: Jul. 1, 1997

[30] Foreign Application Priority Data

Jul. 18, 1996 [JP] Japan ................................ 8-189164

[51] Int. Cl.$^6$ ........................................... G11B 7/00
[52] U.S. Cl. ........................ 369/59; 369/50; 369/58; 369/275.3
[58] Field of Search ...................... 369/47, 48, 49, 369/50, 54, 58, 59, 32, 44.27, 44.34, 44.26, 275.3

[56] References Cited

U.S. PATENT DOCUMENTS

| | | | |
|---|---|---|---|
| 5,285,433 | 2/1994 | Oshiba et al. | 369/44.26 |
| 5,440,474 | 8/1995 | Hetzler | 369/44.26 X |
| 5,592,348 | 1/1997 | Strang, Jr. | 369/44.26 X |
| 5,629,912 | 5/1997 | Okawa et al. | 369/44.26 X |

Primary Examiner—Muhammad N. Edun
Attorney, Agent, or Firm—Limbach & Limbach L.L.P.

[57] ABSTRACT

An ECC encoder adds sync patterns to a preamble part and a data part in respectively different sequences. A modulator modulates data to which sync patterns have been added by the ECC encoder, and the result is recorded on an optical disk. The playback RF signal output by the optical disk is demodulated by a demodulator, and the sync patterns inserted in the signal are detected. From the combinations of detected sync patterns, the demodulator 12 identifies whether a currently reproduced frame is the preamble part or the data part, and from the identification result, playback data is sequentially stored in a predetermined area of a SRAM. It is thus performed to identify a preamble part from a reproduced RF signal, and accurately extract one block of data.

15 Claims, 25 Drawing Sheets

FIG. 5

| | | | |
|---|---|---|---|
| SY0 | ID | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

13 ROWS

FIG. 6

```
      MSB                              LSB
SY0  0001001001000100  0000000000010001
SY1  0000010000000100  0000000000010001
SY2  0001000000000100  0000000000010001
SY3  0000100000000100  0000000000010001
SY4  0010000000000100  0000000000010001
SY5  0010001001000100  0000000000010001
SY6  0010010010000100  0000000000010001
SY7  0010010001000100  0000000000010001
```

FIG. 7A

| | | | |
|---|---|---|---|
| SY0 | ID | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

13 ROWS

FIG. 7B

| | | | |
|---|---|---|---|
| 0 | | 1 | |
| 2 | | 3 | |
| 4 | | 5 | |
| 6 | | 7 | |
| 8 | | 9 | |
| 10 | | 11 | |
| 12 | | 13 | |
| 14 | | 15 | |
| 16 | | 17 | |
| 18 | | 19 | |
| 20 | | 21 | |
| 22 | | 23 | |
| 24 | | 25 | |

13 ROWS

| FIG. 17A |
| FIG. 17B |

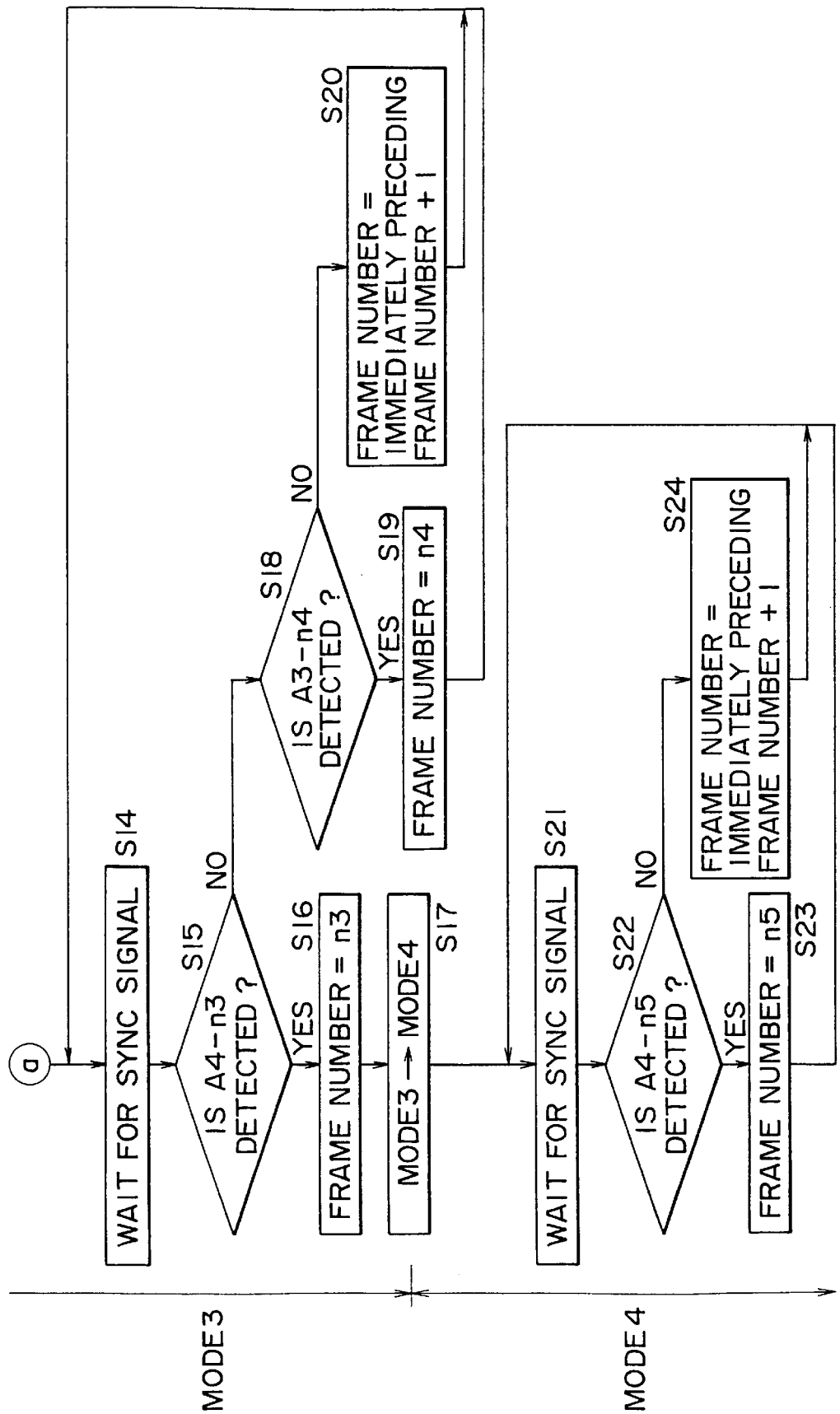

FIG. 19
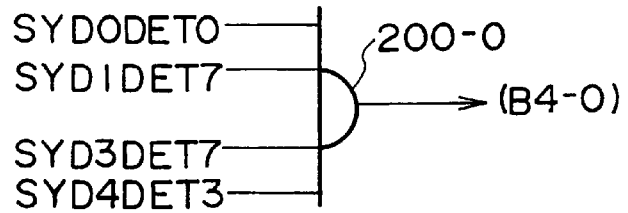
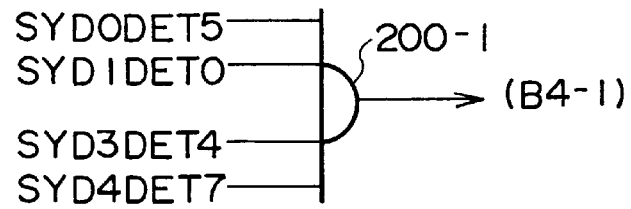
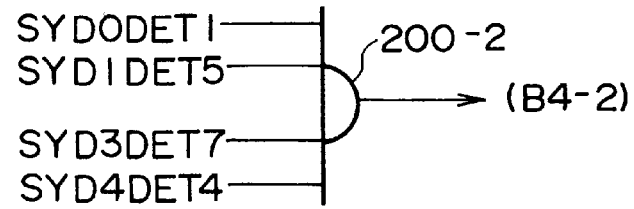
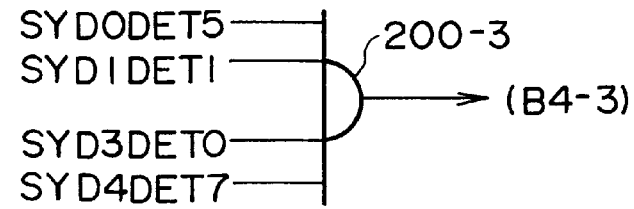
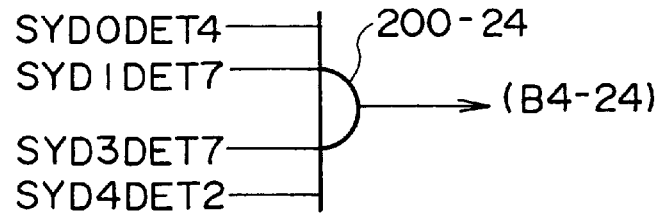
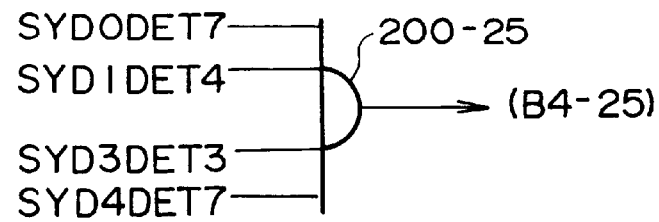

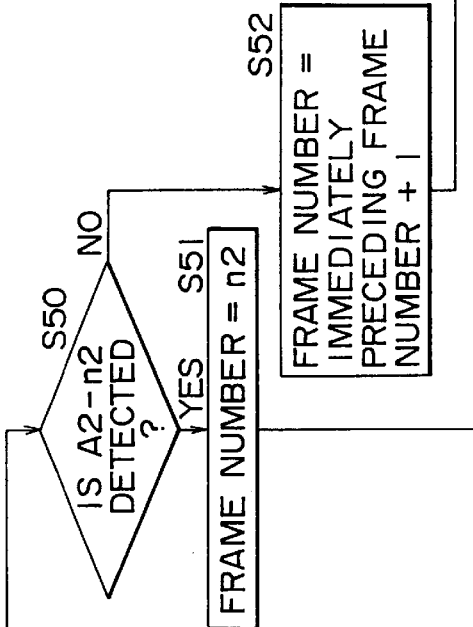
FIG. 20A
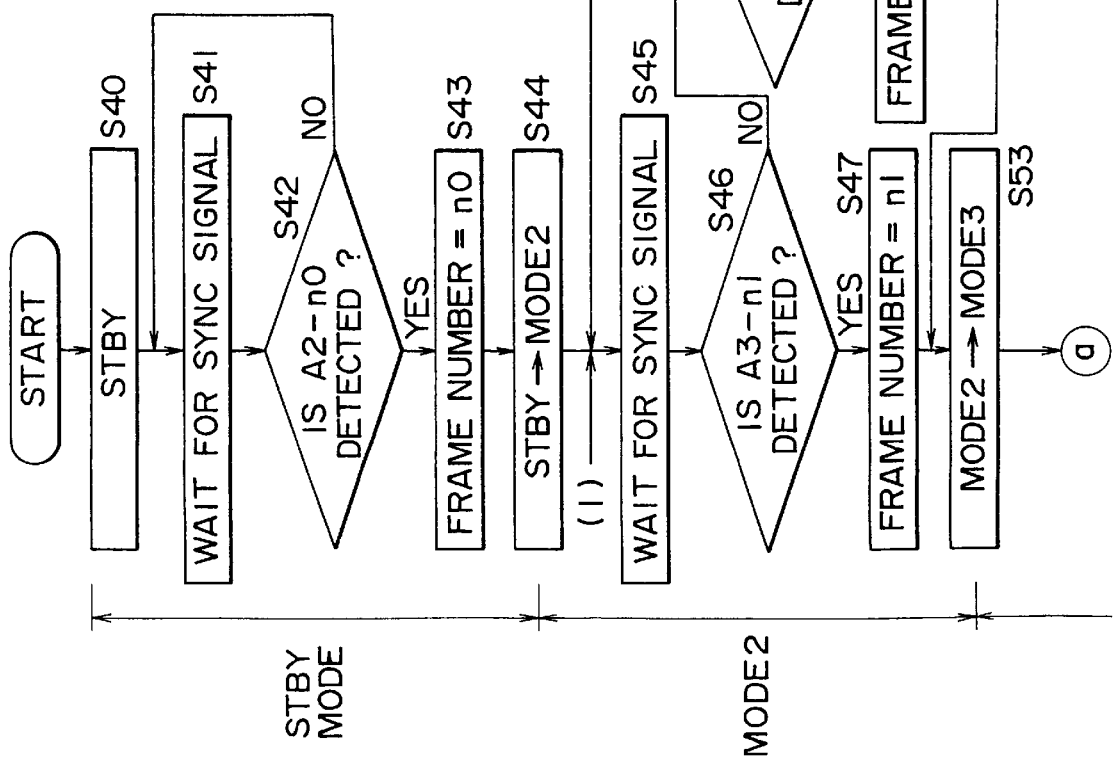

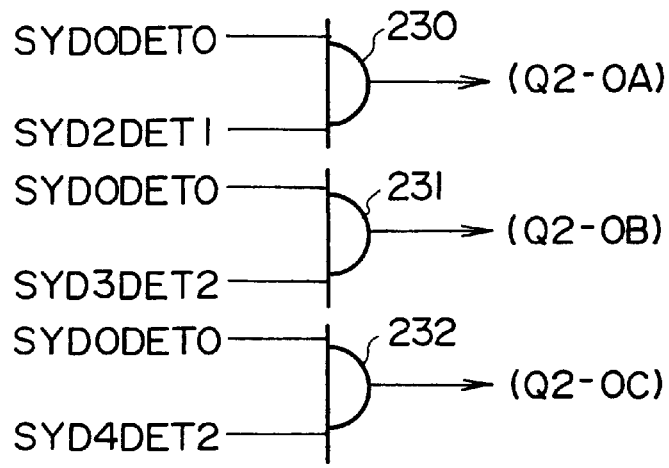
FIG. 21A
FIG. 21B
FIG. 21C
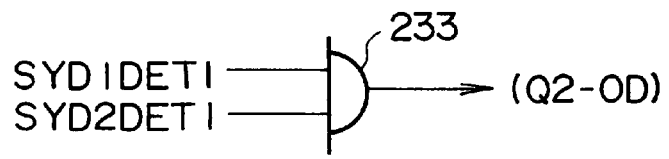
FIG. 21D
FIG. 21E
FIG. 21F
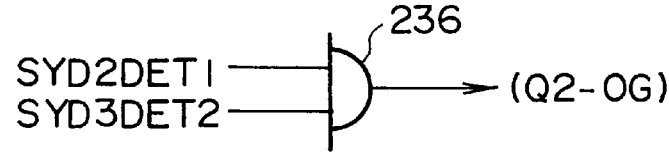
FIG. 21G
FIG. 21H
FIG. 21I

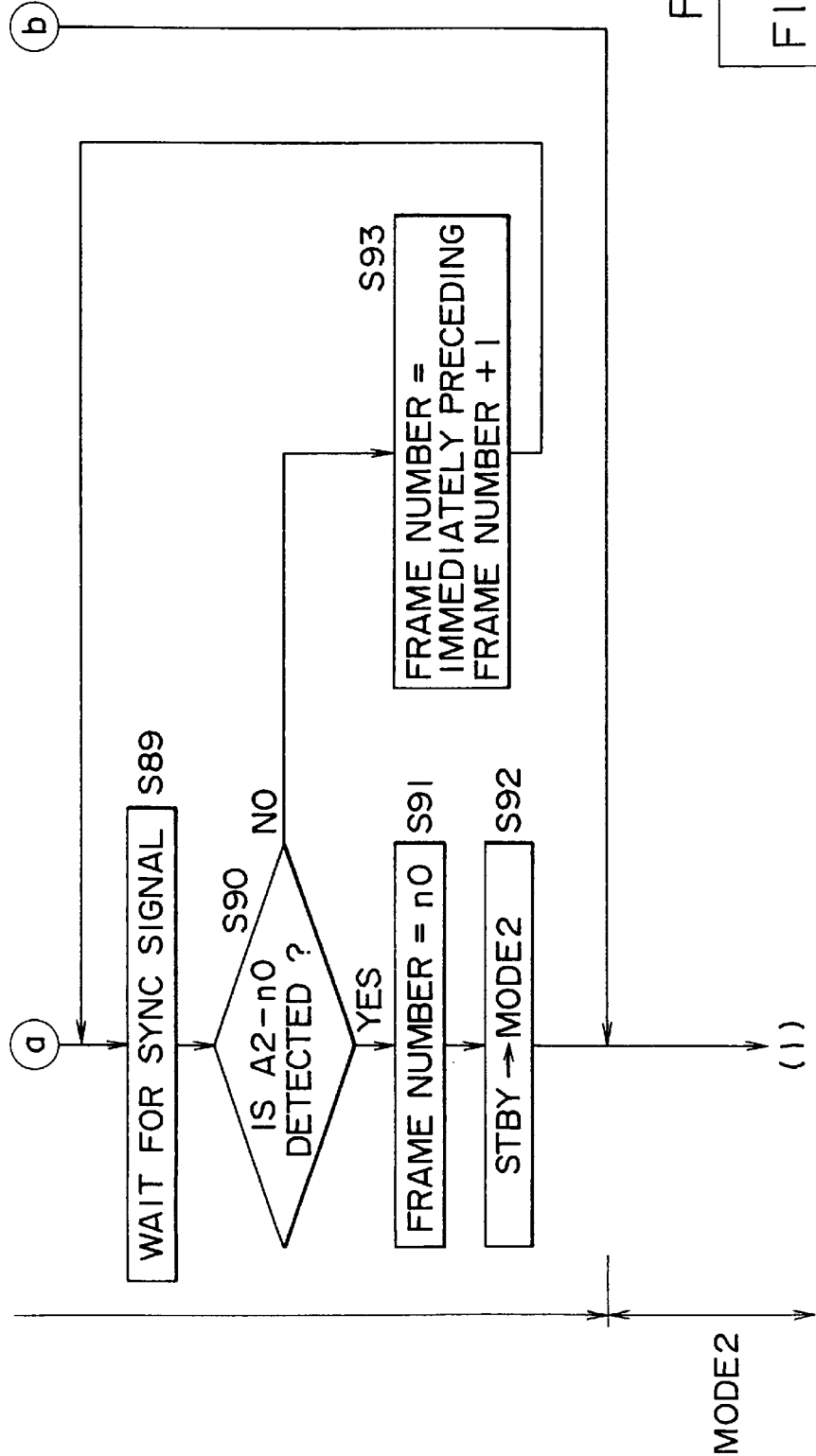

FIG. 23A

| SY4 | SY4 |
| SY2 | SY2 |
| SY1 | SY1 |
| SY3 | SY3 |

FIG. 23B

| SY4 | SY4 |
| SY1 | SY1 |
| SY3 | SY3 |
| SY2 | SY2 |

FIG. 23C

| SY3 | SY3 |
| SY2 | SY2 |
| SY1 | SY1 |
| SY4 | SY4 |

FIG. 23D

| SY4 | SY3 |
| SY2 | SY1 |
| SY1 | SY2 |
| SY3 | SY4 |

RECORDING MEDIUM, RECORDING MEDIUM PLAYBACK DEVICE, RECORDING MEDIUM PLAYBACK METHOD, RECORDING MEDIUM RECORDING DEVICE AND RECORDING MEDIUM RECORDING METHOD

BACKGROUND OF THE INVENTION

This invention relates to a recording medium playback device and recording medium playback method, and in particular to a recording medium playback device and recording medium playback method for playing back a recording medium on which recorded data is divided into frames of predetermined length and sync patterns are inserted between the frames.

In conventional recording medium playback devices where error correction was performed on the reproduced data in data units of predetermined length (blocks), this error correction processing had to be performed after storing one block of data in a memory.

When the blocks were extracted from data read from the recording medium, reference was made to an ID code (code indicating an address) inserted directly after a particular sync pattern so that one block of data could be extracted.

In such a conventional recording mecium playback device, when the medium was scratched or dust adhered to the medium, the ID code could no longer be detected, and it was then difficult to precisely extract one block of data and store it in a predetermined area of the memory.

Error correction was therefore not properly performed, and the recorded data was not accurately reproduced.

OBJECT AND SUMMARY OF THE INVENTION

This invention, which was conceived in view of the above problems, aims to make it possible to extract one block of data accurately from data read from a recording medium even when the medium is scratched or there is dust adhering to the medium, to accurately store the extracted data block in a predetermined area of a memory, and to perform error correction without fail.

In the recording medium of the present invention, when two consecutive sync patterns are arbitrarily selected from a preamble part and a data part, the sync patterns are added to the preamble part and the data part such that different combinations of said patterns are mutually distinct.

The recording medium playback device of the present invention comprises detecting means for detecting sync patterns, and preamble identifying means for identifying a preamble part from a combination of at least two sync patterns detected by the sync pattern detecting means.

The recording medium playback method of the present invention comprises a sync pattern detecting step for detecting sync patterns, and a preamble part identifying step for identifying a preamble part from a combination of at least two sync patterns detected by the sync pattern detecting means.

The recording medium recording device of the present invention comprises first sync pattern adding means for adding sync patterns in a predetermined sequence to the frames forming a data part, and second sync pattern adding means for adding sync patterns to the frames forming said preamble part such that it is different from the first sync pattern means.

The recording medium recording method of the present invention comprises a first sync pattern adding step for adding sync patterns in a predetermined sequence to the frames forming a data part, and a second sync pattern adding step for adding sync patterns to the frames forming a preamble part such that it is different from the first sync pattern adding step.

In the recording medium of the present invention, when two consecutive sync patterns are arbitrarily selected from a preamble part and a data part, the sync patterns are added to the preamble part and the data part such that different combinations of said patterns are mutually distinct. For example, when two consecutive sync patterns are arbitrarily selected from the preamble part, the type and sequence of the patterns are set so that there are no identical combinations of sync patterns in the data part.

Moreover, in the recording medium playback device of the present invention, sync pattern detecting means detects sync patterns, and preamble identifying means identifies a preamble part from a combination of at least two sync patterns detected by the sync pattern detecting means. For example, the preamble identifying means determines whether or not the current data being read from the combination of two consecutive sync patterns detected by the sync pattern detecting means is a preamble part.

Further, in the recording medium playback method of the present invention, a sync pattern detecting step detects sync patterns, and a preamble identifying step for identifying a preamble part from a combination of at least two sync patterns detected by the sync pattern detecting means, identifies a preamble part. For example, the preamble identifying step determines whether or not the current data being read from the combination of two consecutive sync patterns detected by the sync pattern detecting means is a preamble part.

Moreover, in the recording medium recording device of the present invention, first sync pattern adding means adds sync patterns in a predetermined sequence to the frames forming a data part, and second sync pattern means adds sync patterns to the frames forming a preamble part such that it is different from the first sync pattern means. For example, first sync pattern adding means adds sync patterns SY0–SY4 to odd-numbered frames, and adds sync patterns SY5–SY7 to even-numbered frames, while second sync pattern adding means suitably combines sync patterns SY1–SY4 and adds the result to the frames in the preamble part.

Further, in the recording medium recording method of the present invention, a first sync pattern adding step adds sync patterns in a predetermined sequence to the frames forming a data part, and a second sync pattern adding step adds sync patterns to the frames forming a preamble part such that it is different from the first sync pattern adding step. For example, the first sync pattern adding step adds the sync patterns SY0–SY4 to odd-numbered frames, and adds the sync patterns SY5–SY to even-numbered frames, while the second sync pattern adding step suitably combines synchronizing the patterns SY1–SY4 and adds the result to the frames in the preamble part.

BRIEF DESCRIPTION OF THE DRAWINGS

FIG. 5 is a diagram showing the format of a sector.

FIG. 6 is a diagram showing a typical sync pattern.

FIGS. 7A and 7B are diagrams showing the correspondence between a sector and a frame number.

FIGS. 17A and 17B are diagrams showing typical processing performed by a sequencer 35 shown in FIG. 8.

FIG. 19 is a diagram showing a typical construction of the consecutive match detecting circuit 55 shown in FIG. 10.

FIGS. 20A and 20B are diagrams showing typical processing performed by the sequencer 35 shown in FIG. 8.

FIGS. 21A to 21I are circuits showing a typical construction of a circuit for detecting a sync pattern at the head of a sector.

FIGS. 22A and 22B are diagrams showing typical processing performed by the sequencer 35 shown in FIG. 8.

FIGS. 23A to 23D are diagrams showing another typical arrangement of sync patterns in the preamble part applying this invention.

DESCRIPTION OF THE PREFERRED EMBODIMENTS

Figure 1:
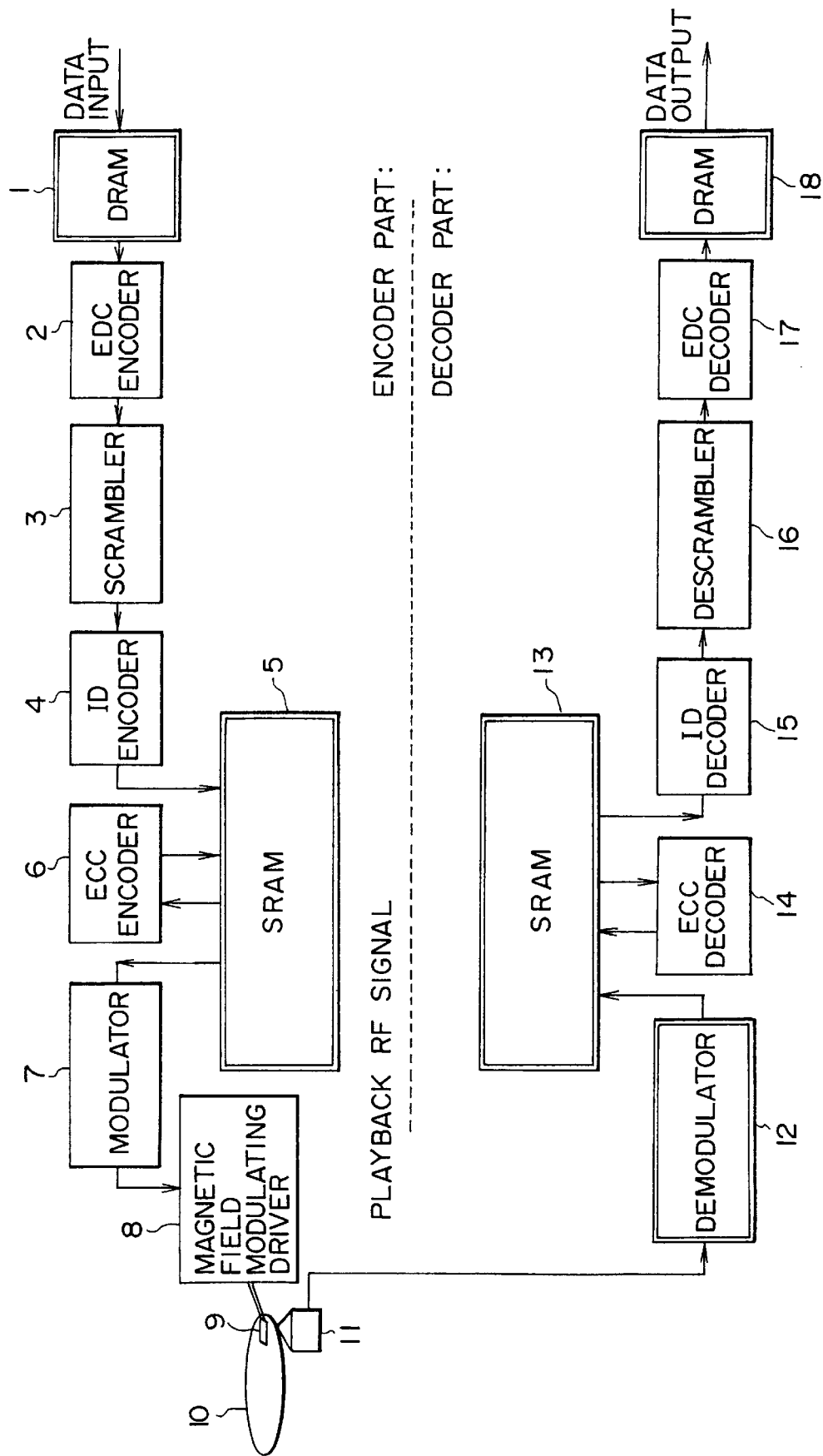
FIG. 1 is a block diagram showing a typical construction of an optical disk recording/playback device applying this invention.

FIG. 1 is a block diagram showing a typical construction of an optical disk recording/playback device applying this invention.

In this figure, a DRAM 1 (Dynamic Random Access Memory) temporarily stores input data. An EDC (Error Detection Code) encoder 2 adds an EDC for error detection to the data supplied from the DRAM 1, and outputs the result. A scrambler 3 scrambles the data output by the EDC encoder 2. An ID encoder 4 adds an ID code to the scrambled data.

The data output by the ID encoder 4 is stored in a SRAM (Static Random Access Memory) 5, and when one block of data has been stored, an ECC and sync pattern are added by an ECC (Error Correction Code) encoder 6 (first sync pattern adding means, first sync pattern adding step, second sync pattern adding means, second sync pattern adding step). A modulator sequentially reads the data stored in the SRAM 5, and after performing predetermined modulation, supplies the result to a magnetic field modulating driver 8.

The magnetic field modulating driver 8 drives a magnetic field coil 9 according to the data supplied from the modulator 7, and thereby applies a magnetic field to a region of an optical disk 10 on which it is desired to record data. An optical pickup 11 irradiates the optical disk 10 by a recording laser beam or playback laser beam, a playback laser beam reflected from the optical disk 10 is opto-electrically converted to an electrical signal, and the result is output as a playback RF signal.

A demodulator 12 (sync pattern detecting means, sync pattern detecting step) performs predetermined demodulation processing on the playback RF signal output by the optical pickup 11, and the data obtained is stored in a predetermined area of the SRAM 13. When one block of the data supplied by the demodulator 12 has been stored in the SRAM 13, the ECC decoder 14 performs error correction processing.

An ID decoder 15 reads the data stored in the SRAM 15 and outputs an ID code. A descrambler 16 descrambles the data output by the ID decoder 15. An EDC decoder 17 extracts the EDC from the data output by the descrambler 16 and thereby determines whether or not the reproduced data contains an error. A DRAM 18 temporarily stores the data output by the EDC decoder 17, and outputs it.

Next, the operation of this example will be described.

After input data has been temporarily stored in the DRAM 1, it is output to the EDC encoder 2. The EDC encoder 2 adds an error detection EDC to the data output by the DRAM 1, and supplies the result to the scrambler 3. The scrambler 3 scrambles the data (changes the data sequence) to prevent any bias of fixed patterns or DC component) in the signal recorded on the optical disk 10, and outputs the result to the ID encoder 4.

The ID encoder 4, after inserting an ID code into the header on each sector to detect addresses on the disk 10, sequentially stores the data in the SRAM 5. When one block of data has been stored in the SRAM 5, the ECC encoder 6 adds an ECC and sync pattern to the data.

Figure 2:
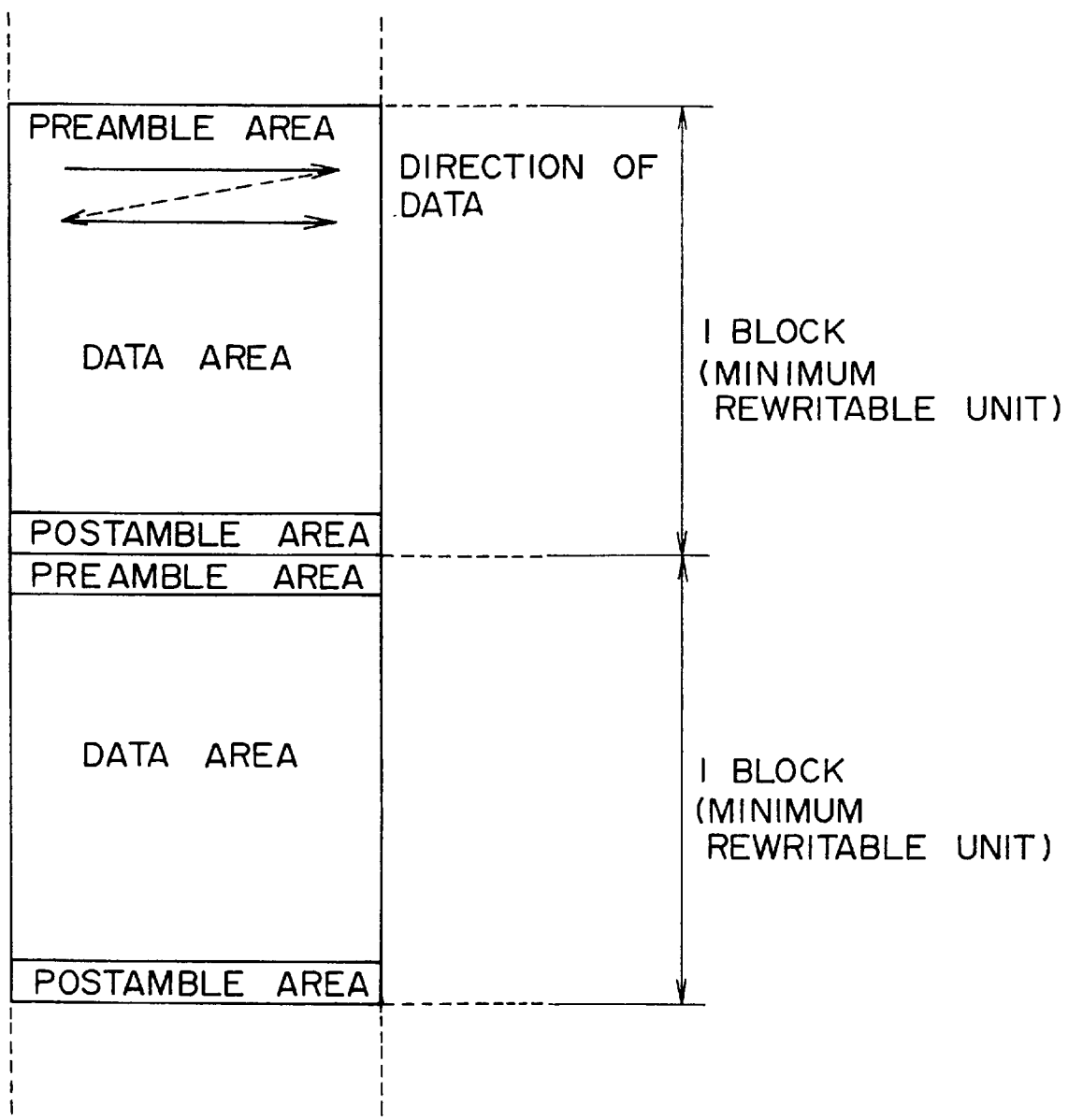
FIG. 2 is a diagram showing a typical format of data recorded on an optical disk 10 according to the example shown in FIG. 1.

FIG. 2 shows a typical data format.

Data is divided into blocks of minimum rewritable units. Each block comprises a preamble part added to the header, a data part, and a postamble part added to a footer.

Figure 3:
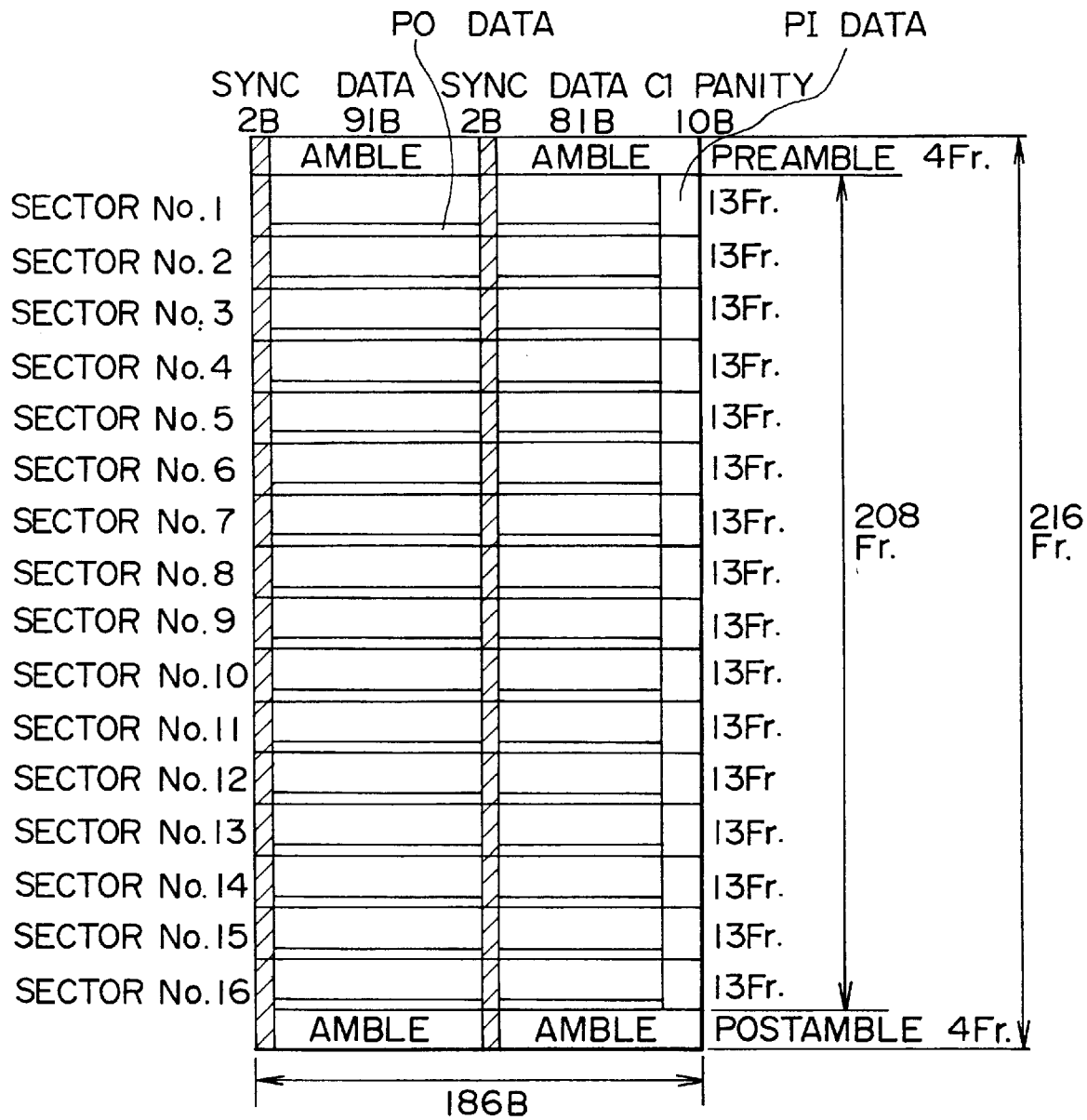
FIG. 3 is a diagram showing the format of one block of the data shown in FIG. 2.

FIG. 3 shows a typical format of the data block shown in FIG. 2. One block horizontally comprises 186 bytes and vertically comprises 216 frames. The data part comprises 16 sectors, each sector being divided into two in the middle (left and right in the figure). Each sector comprises 13 frames, and one block comprises 416(=208×2) frames of data. A preamble part and a postamble part each comprising four frames are respectively added to the data parts on the left and right (top and bottom of figure), and two bytes of synchronizing data (SYNC) are added to the headers on the left and right (left and right of figure) PI data for error correction is also added to the end of each sector, and PO data for error correction is interleaved with each sector.

Figure 4:
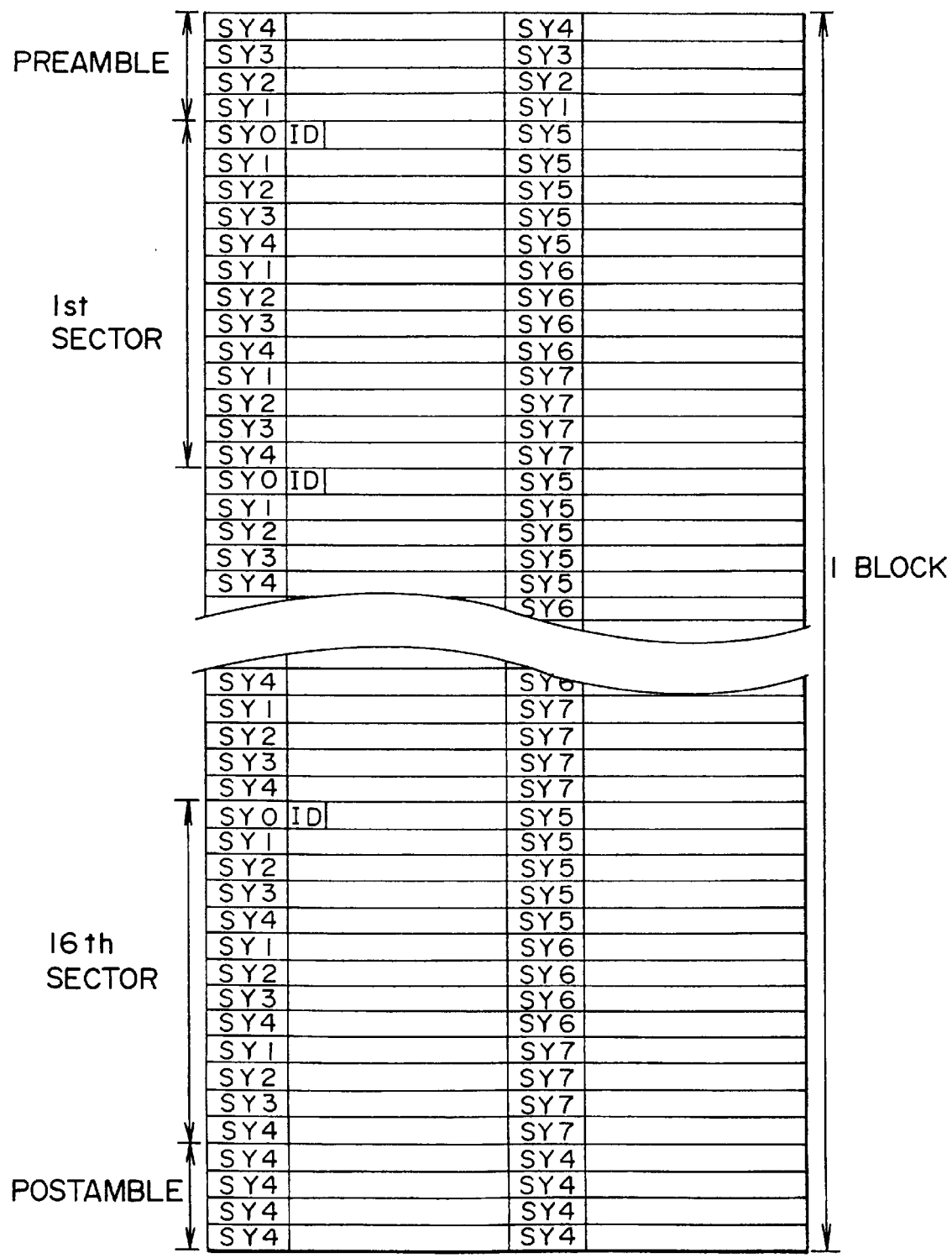
FIG. 4 is a diagram shows a sync pattern arranged in one block of data shown in FIG. 3.

FIG. 4 shows a typical arrangement of sync patterns in each block.

The preamble part pulls in a PLL (Phase Locked Loop) for data, and it is also the part where data is superposed on data which has just been recorded when data is overwritten. In other words, when data is overwritten, it prevents erasure of data which has already been recorded, i.e. it is a capture part.

The sync patterns SY4 to SY1 are respectively added to the frame headers in the 1st to the 4th row of the preamble part. The sync pattern SY0 is added to the 1st frame in the 1st row of each sector of the data part, and the sync patterns SY1 to SY4 are sequentially arranged at the heads (odd-numbered frames) of the 2nd and subsequent rows (2nd row to 13th row). A sync pattern SY5 is stored in the 2nd (even-numbered) frame of the 1st to the 5th row, a sync pattern SY6 is stored in the 2nd frame of the 6th to the 9th row, and a sync pattern SY7 is stored in the 2nd frame of the 10th to the 13th rows.

An ID code is added to identify addresses immediately after the sync pattern SY0 at the heads of the 1st to the 16th sectors, and the sync pattern SY4 is stored in all frames in the postamble part.

Due to this format, the preamble part and data part may be easily distinguished by the regularity of sync patterns as will be hereafter described.

FIG. 5 shows a typical arrangement of each sector. As seen from this figure, each sector comprises 13 rows and each row comprises 2 frames, so one sector comprises 26 frames.

FIG. 6 shows a typical arrangement of the sync patterns SY0 to SY7. The sync patterns each comprise 32 bits which are differently arranged in each pattern.

Returning to FIG. 1, data to which an ECC and a sync pattern have been added by the ECC encoder 6 is sequentially read from the SRAM 5 and supplied to the modulator 7. After the modulator 7 has performed a predetermined modulation on the data, the result is output to the magnetic field modulating driver 8. The magnetic field modulating driver 8 drives the magnetic field coil 9 according to the data supplied by the modulator 8, and applies a magnetic field to a predetermined area of the optical disk 10.

The optical pickup 11 then emits a recording laser beam, and the temperature of the recording medium rises in the area of the optical disk 10 irradiated by the beam so that it exceeds the Curie point. The part of the recording medium of which the temperature exceeds the Curie point is magnetized in the direction of the magnetic field applied by the magnetic field coil 9, and data is thereby recorded.

Next, playback of the data recorded on the optical disk will be described.

The optical pickup 11 irradiates a predetermined area of the optical disk 10 by a playback laser beam of lower intensity than the recording laser beam, and a playback RF signal is generated by opto-electrical conversion of the reflected light. After the playback RF signal is demodulated by the demodulator 12, it is stored in the SRAM 13 in one block units. When data from the demodulator 12 is stored in the SRAM 13 in one block units, one block of data must be accurately extracted from the playback RF signal and accurately stored in a predetermined area of the SRAM 13. The processing performed in this case will be described hereafter.

After error correction has been performed by the ECC decoder 14 on the data block stored in the SRAM 13, the data is sequentially read by the ID decoder 15 and the ID code is extracted. The descrambler 16 descrambles the data output by the ID decoder 15 by referring to the extracted ID code, and the result is output to the EDC decoder 17. The EDC decoder 17 detects an EDC from the descrambled data, and determines whether or not the playback data contains an error. When it is determined that the data does not contain an error, the data is output to the DRAM 18. When it is determined that the data does contain an error, the optical pickup may for example be controlled so that the same data is read again from the optical disk 10.

After it has temporarily stored the data output by the EDC decoder 17, the DRAM 18 outputs it in synchronism with the speed of data reading by an external device, not shown.

Next, the construction and operation of the demodulator 12 shown in FIG. 1 will be described.

As error correction is performed in block units according to this example as described hereabove, the data demodulated by the demodulator 12 is temporarily stored in the SRAM 13 in block units. In this case, it is necessary that one block of data is accurately extracted from the playback RF signal and accurately stored in the predetermined area of the SRAM 13. According to this example, the preamble part is first detected by the method shown below, and a frame number (described hereafter) of a frame in the data part which is read immediately afterwards is detected by a frame detecting circuit shown below. One block of data is then accurately extracted from the playback RF signal based on the detected frame number, and stored in the predetermined region of the SRAM 13.

FIGS. 7A and 7B are diagrams showing one arrangement of frame numbers in a sector. FIG. 7A shows the composition of the sector, and FIG. 7B shows frame numbers assigned to the frames shown in FIG. 7A. More specifically, the frame numbers 0 to 25 are assigned to the 26 frames in each sector.

Figure 8:
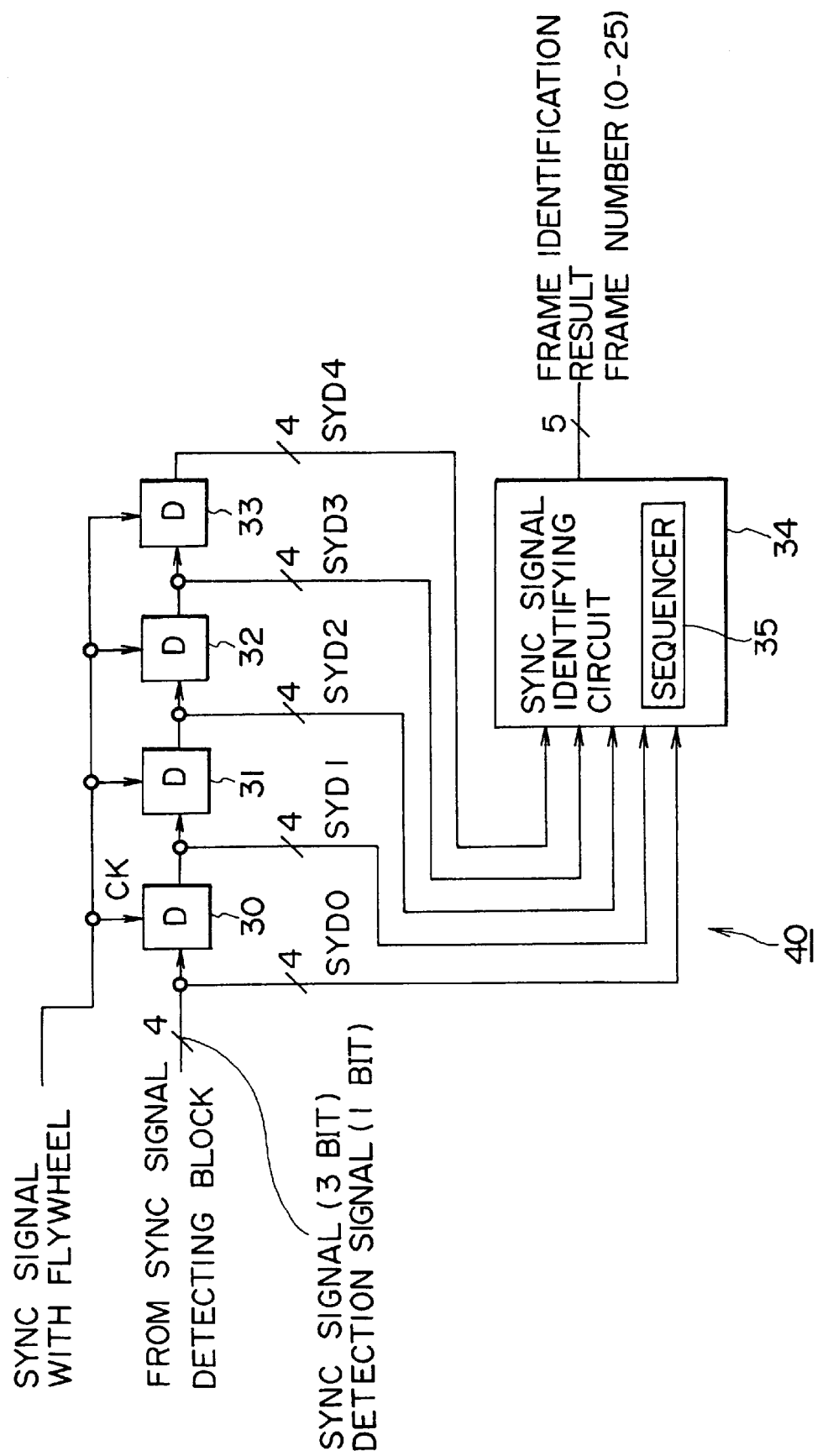
FIG. 8 is a diagram showing a typical detailed construction of a demodulator 12 shown in FIG. 1.

FIG. 8 is a block diagram showing a typical construction of a frame identifying circuit 40 in the demodulator 12.

In this figure, shift registers 30 to 33 are four bit shift registers. A 3 bit sync signal and a 1 bit detecting signal output by a detecting block, not shown, in the demodulator 12 is input to these registers where the signals are sequentially shifted in synchronism with a sync signal supplied by a flywheel (described hereafter).

The data input to the shift register 30 (data output by the detecting block, not shown), and the data output by the shift registers 30 to 33 are respectively input to a sync signal identifying circuit 34 as signals SYD0 to SYD4. The frame number of the frame which is currently being reproduced is detected by a sequencer 35 based on the signals SYD0 to SYD4, and output.

Figure 9:
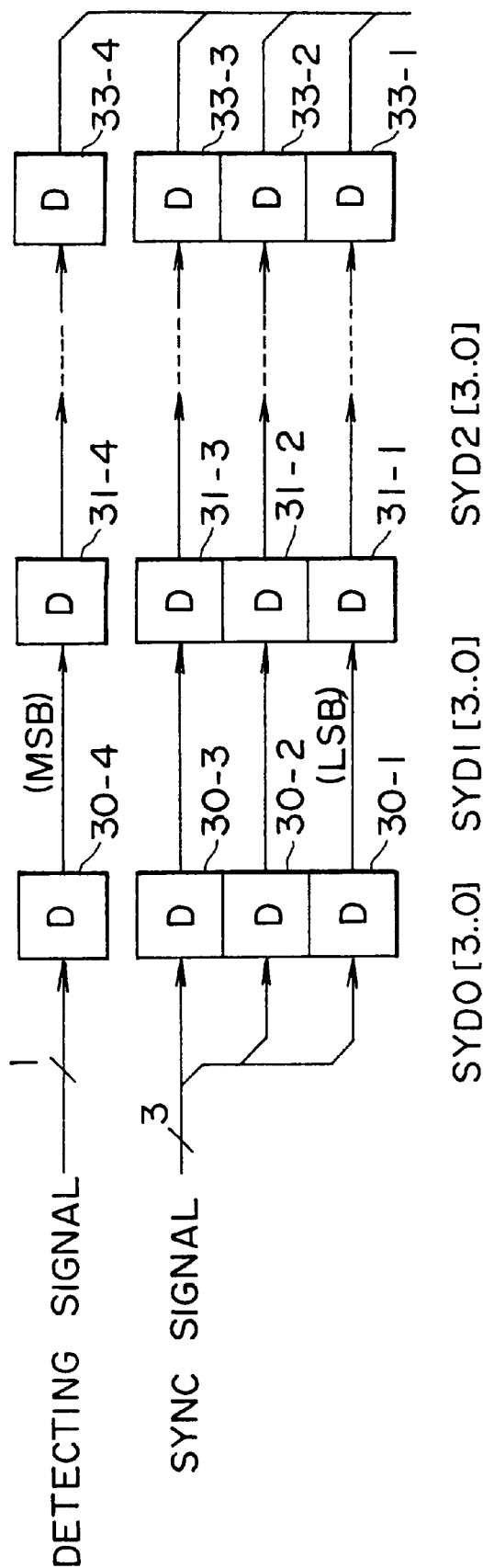
FIG. 9 is a diagram showing a typical detailed construction of a shift register shown in FIG. 8.

FIG. 9 shows a typical detailed arrangement of the shift registers 30 to 33 shown in FIG. 8.

The 3 bit sync signal in the signal supplied by the sync signal detecting block, not shown, is a signal showing which of the patterns SY0 to SY7 corresponds to the reproduced sync pattern. The following relation exists between the sync pattern and the arrangement of bits in the sync signal:

$$SY0 \rightarrow \text{"000"}$$

$$SY1 \rightarrow \text{"001"}$$

$$\vdots$$

$$SY7 \rightarrow \text{"111"}$$

The detecting signal is also output by the sync signal detecting block, not shown, and when the sync pattern extracted from the reproduced RF signal is identical to any of the patterns shown in FIG. 6, this signal is "1", otherwise it is "0".

The 3 bit sync signal is input to shift registers 30-1 to 30-3, and the detecting signal is input to a shift register 30-4. The input data is progressively shifted to the shift register immediately to the right in synchronism with a sync signal supplied by the flywheel. As the signals input to and output from the shift registers 30 to 33 are input to the sync signal identifying circuit 34, signals delayed by an integral number of sync signal periods are supplied to the sync signal identifying circuit 34. In other words, signals delayed by 0 to 4 periods are respectively supplied to the sync signal identifying circuit SYD0 to SYD4.

The flywheel generates a sync pattern by referring to a counter, not shown, when the sync pattern cannot be reproduced due to a scratch, etc., on the disk, and shows an insertion at a predetermined position of the data. This type of processing is generally performed in a CD (Compact Disk), MD (Mini Disk) or the like.

Figure 10:
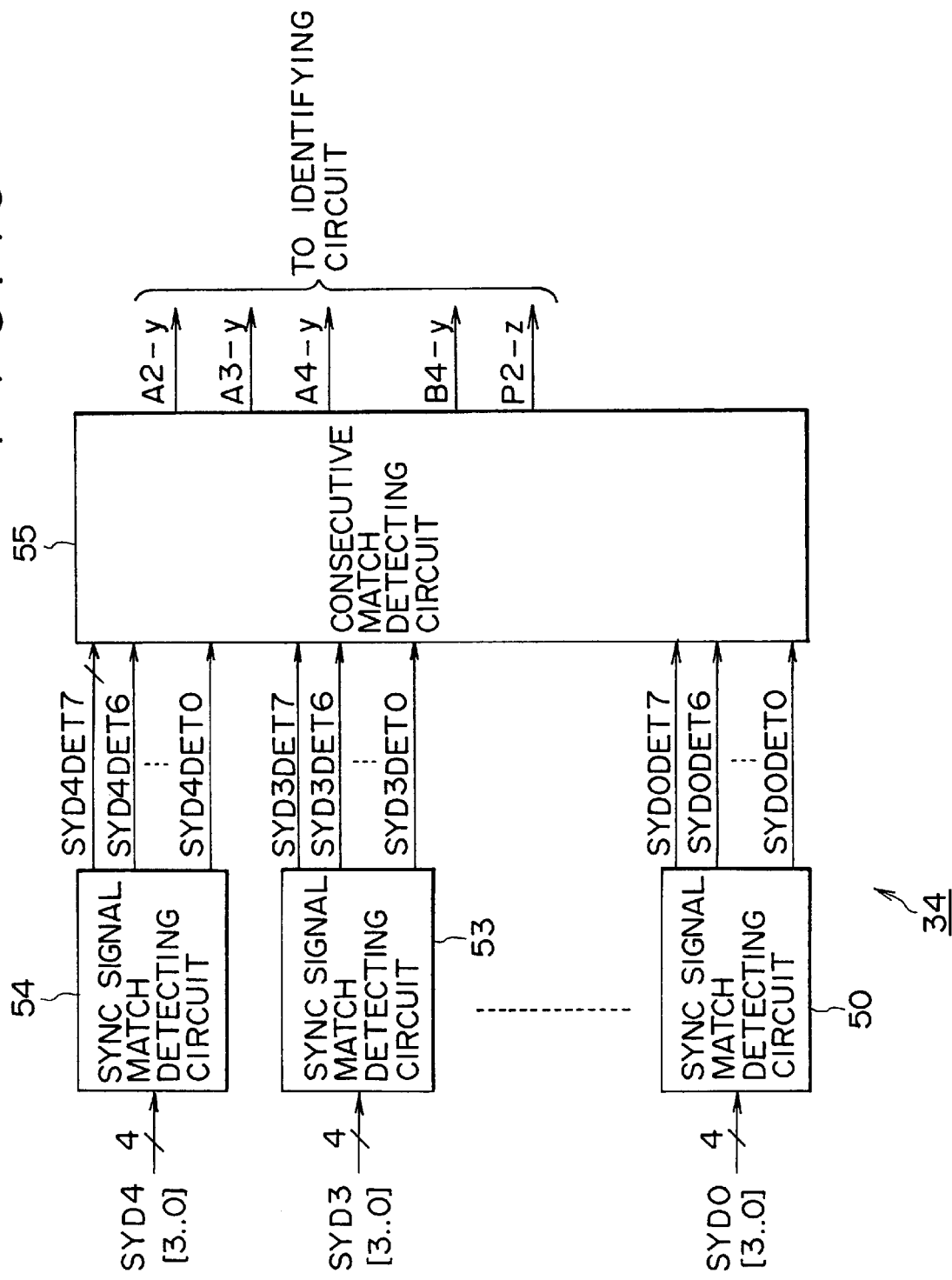
FIG. 10 is a diagram showing a typical detailed construction of a sync signal identifying circuit 34 shown in FIG. 8.

FIG. 10 shows a typical detailed construction of the sync signal identifying circuit 34 shown in FIG. 8.

In this figure, sync signal match detecting circuits 50 to 54 detects which of the sync patterns SY0 to SY7 corresponds to the signals SYD0 to SYD4 output by the shift registers 30 to 33. For example, in the sync signal match detecting circuit 50, the signal SYD0 which is not delayed is input, and when the input sync signal corresponds to SY0, only a signal SYD0DET0 is "1".

As the signals SYD0 to SYD4 each comprise four bits, these signals are hereafter represented by SYD0 [3 . . . 0] to SYD4 [3 . . . 0]. Also in the signal SYDxDETy output by the sync signal match detecting circuits 50 to 54, x represents a delay number and y indicates the corresponding SYNC pattern (SY0 to SY7). For example, when the signal SYD4DET7 output by the sync signal match detecting circuit 54 is "1" it signifies that the signal SY7 delayed by four periods was detected.

Based on the signals output by the sync signal match detecting circuits 50 to 54, a consecutive match detecting circuit 55 detects the frame number of the frame for which data is currently being read, and the result is output as signals A2-y to A4-y and a signal B4-y. When the preamble part is detected, the detection result is output as a signal P2-z. In Ax-y (or Bx-y), x represents a number of consecutively matching sync signals and y shows the frame number. In P2-z, "2" signifies that two predetermined sync patterns were consecutively detected in the preamble part, and z shows the position of the detected frame in the preamble part.

Figure 11:
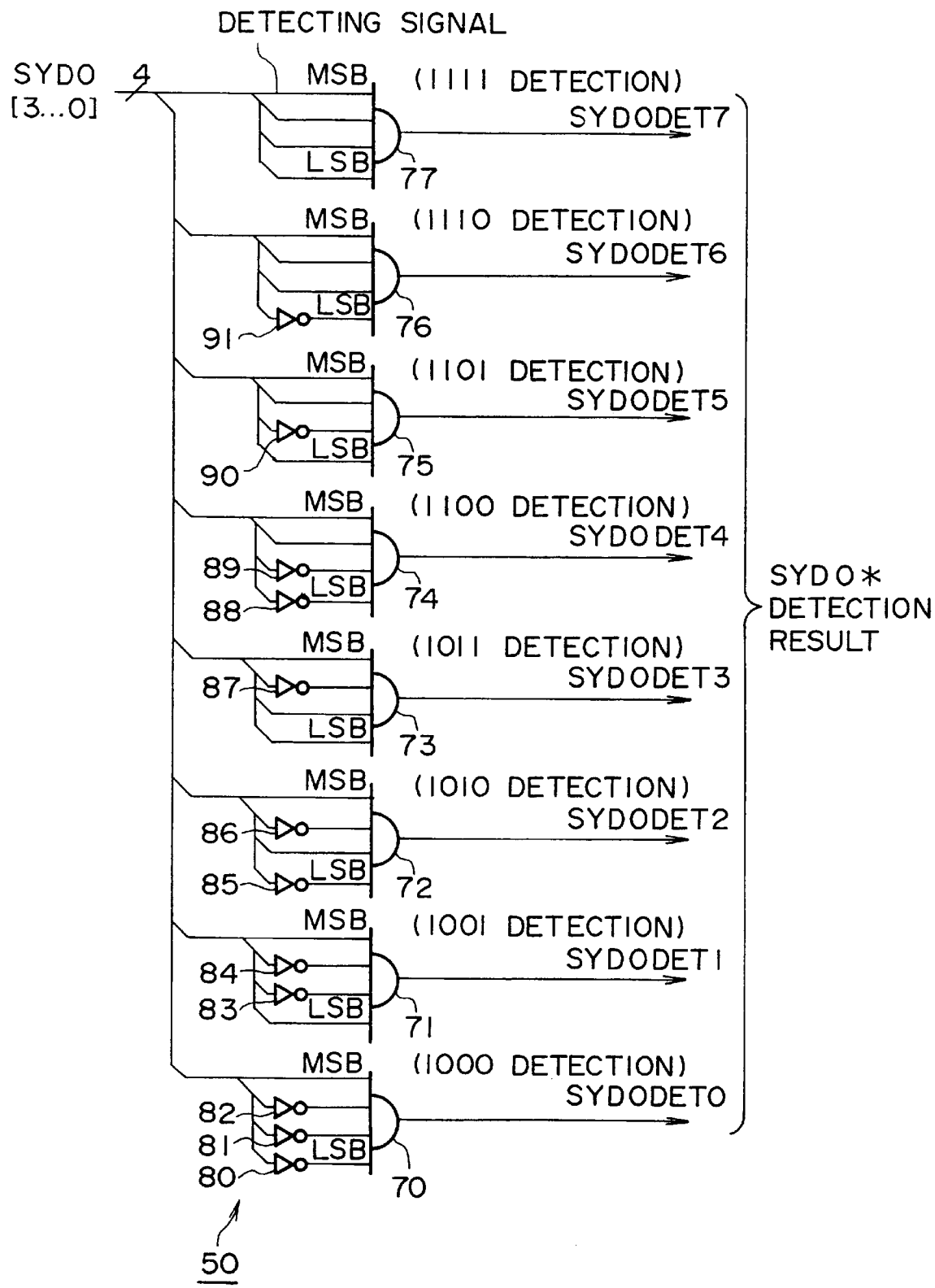
FIG. 11 is a diagram showing a typical detailed construction of a sync signal match detecting circuit 50 shown in FIG. 10.

FIG. 11 shows a typical detailed construction of the sync signal match detecting circuit 50 shown in FIG. 10.

As shown in this figure, the sync signal match detecting circuit 50 comprises AND circuits 70 to 77 and inverters 80 to 91. When the detecting signal which is the MSB (Most Significant Bit) of the signal SYD0 [3 . . . 0] output by the sync signal detecting block, not shown, is "0" (when the sync signals were not correctly detected) the outputs of the AND circuits 70 to 77 are all "0". Conversely when the detecting signal is "1", one of the outputs of the AND circuits is "1" depending on the state of the sync signals. For example, when the detecting signal is "1" and the sync signals are "111", only the output of the AND circuit 77 is "1". In other words, the sync signal match detecting circuit 50 is a decoder which converts 4 bit data to 8 bit data.

Figure 12:
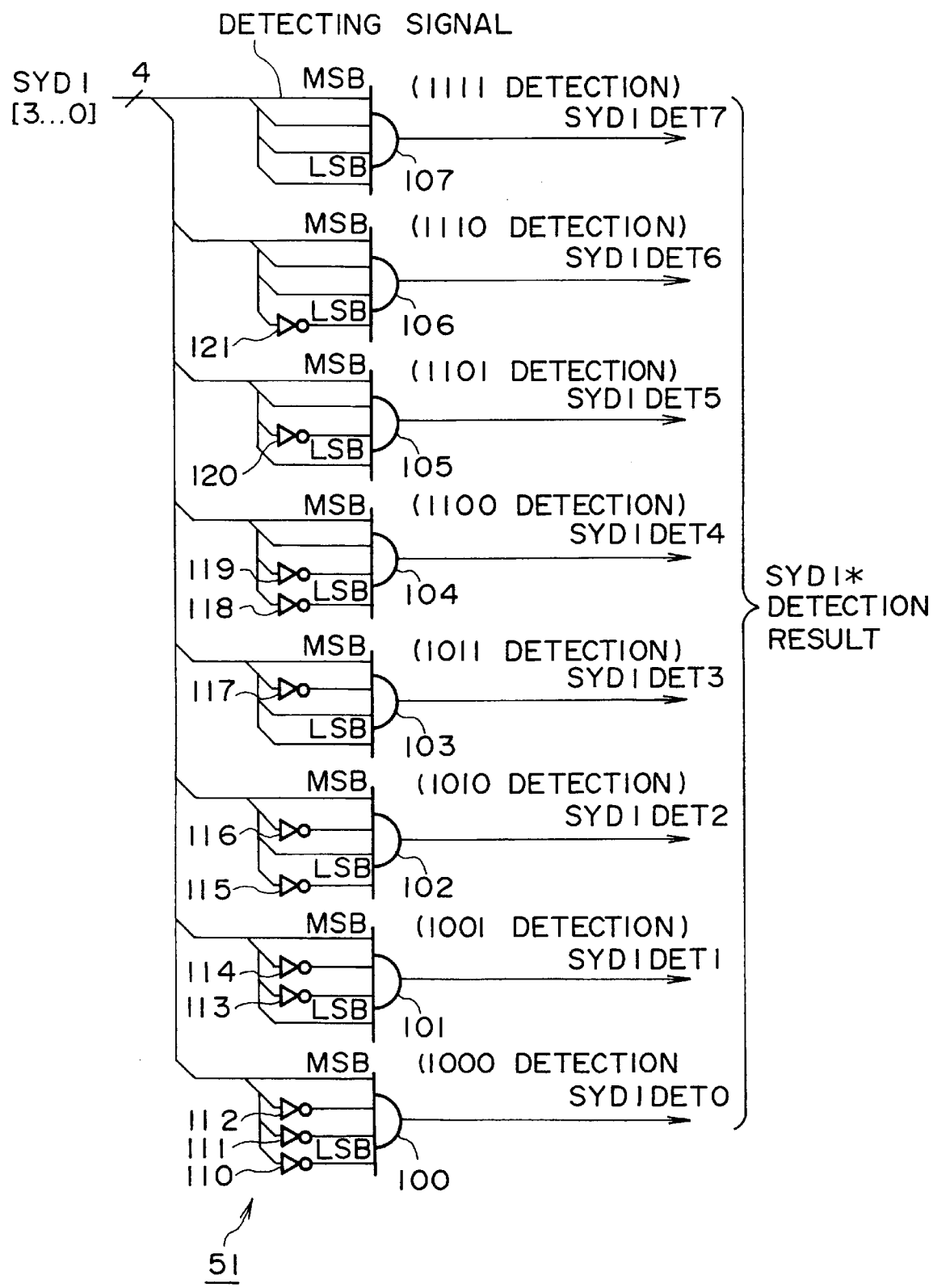
FIG. 12 is a diagram showing a typical detailed construction of a sync signal match detecting circuit 51 shown in FIG. 10.

FIG. 12 shows a typical construction of the sync signal match detecting circuit 51, not shown. The sync signal match detecting circuit 51 has an identical construction to that of the sync signal match detecting circuit 50, i.e. it comprises AND circuits 100 to 107 and inverters 110 to 121, and it generates signals SYD1DET0 to SYD1DET7 from the input signal SYD1 [3 . . . 0]. As the sync signal match detecting circuits 52 to 54 have an identical construction, their description will be omitted.

In this way, 5 types each comprising 8 signals (a total of 40 signals) are generated from 5 types of 4 bit signals (SYD0 [3 . . . 0] to SYD4 [3 . . . 0], as follows:

$$SYD0[3...0] \to SYD0DET0 \text{ to } SYD0DET7$$

$$SYD1[3...0] \to SYD1DET0 \text{ to } SYD1DET7$$

$$\vdots$$

$$SYD7[3...0] \to SYD7DET0 \text{ to } SYD7DET7.$$

By referring to the states of these 40 signals, the consecutive match detecting circuit 55 detects whether or not the sync signals match consecutively, and outputs signals A2-y, A3-y, A4-y, B4-y (described hereafter) and P2-z.

Figure 13:
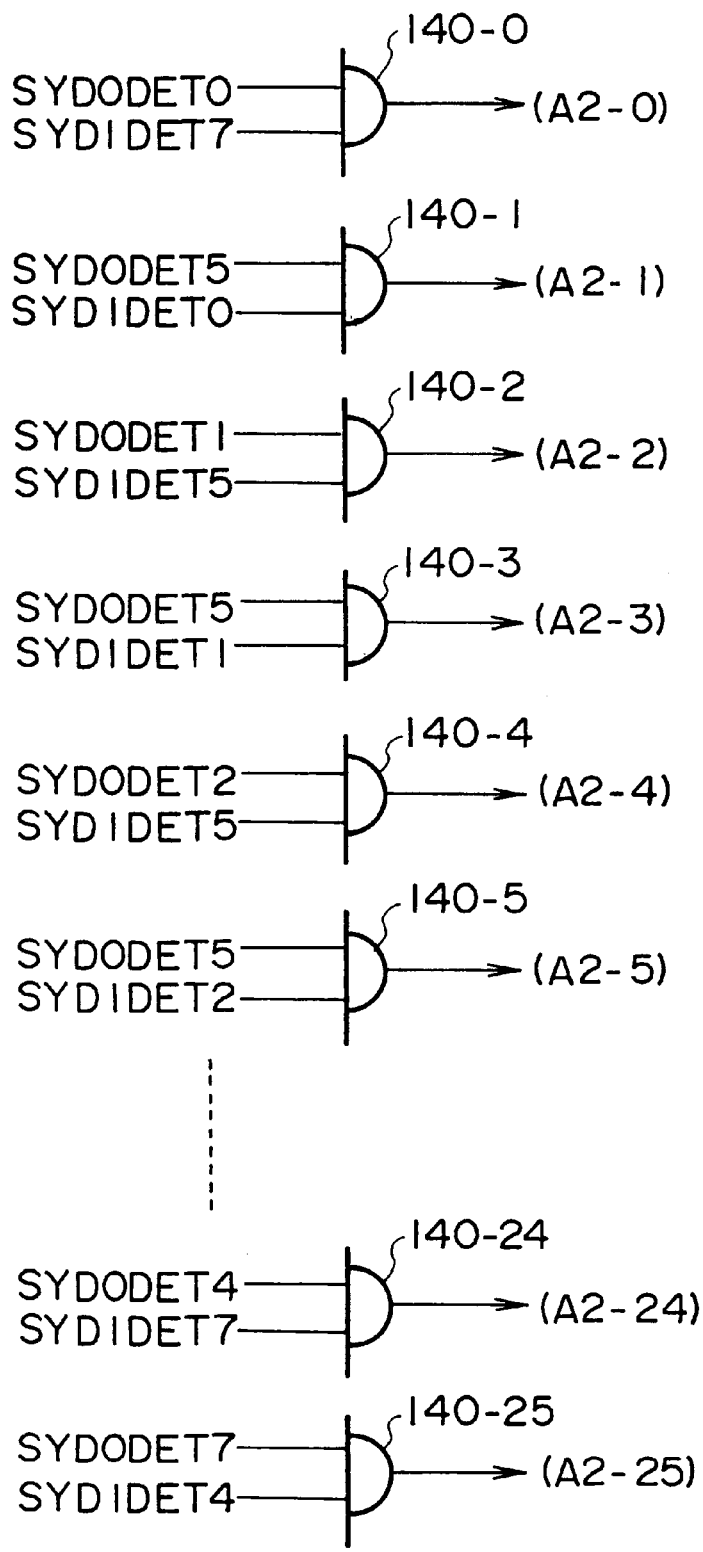
FIG. 13 is a diagram showing a typical construction of a consecutive match detecting circuit 55 shown in FIG. 10.

FIG. 13 shows a typical construction of a circuit in this consecutive match detecting circuit 55 which detects a part where two sync signals match consecutively.

As can be seen from this figure, the circuit which detects a part where two consecutive sync signals match comprises AND circuits 140-0 to 140-25. A combination of one of the signals output by the sync signal match detecting circuit 50 shown in FIG. 10 and one of the signals output by the sync signal match detecting circuit 51, is input to these circuits.

The combination of these signals is based on the arrangement of the sync patterns SY0 to SY7 in the sector. In other words, a signal SYD0DET0 output by the sync signal match detecting circuit 50 and a signal SYD1DET7 output by the sync signal match detecting circuit 51 are input to the AND circuit 140-0. There fore when the sync pattern of the frame currently being read is SY0 and the sync pattern of the frame which was read on the immediately preceding occasion is SY7 (in sectors 2 to 16, when a sync pattern is read from a frame with number 0), the state of a signal A2-0 output by the AND circuit 140-0 is "1". This signal A2-0 shows that the signal currently being read is a frame with a frame number 0.

In the 1st sector, as the sync pattern SY7 is not stored in the frame immediately prior to the frame with frame number 0 (in this case, the last frame of the preamble part), the output of the AND circuit 140-0 is never "1" in the frame with frame number 0.

Likewise, when the frame with frame number 1 is currently being played back, i.e. when SY5 is currently being read and SY0 was read on the immediately preceding occasion, the AND circuit 140-1 outputs a signal A2-1 with a state "1". The AND circuits 140-2 to 140-25 are identical, and when two consecutive sync patterns are both detected in the sector, their outputs are "1". By detecting the states of these signals A2-0 to A2-25, it is possible to know from which frame data is currently being read. For example, when the signal A2-25 is "1", it is possible to know that data is currently being read from the frame with frame number 25.

Figure 14:
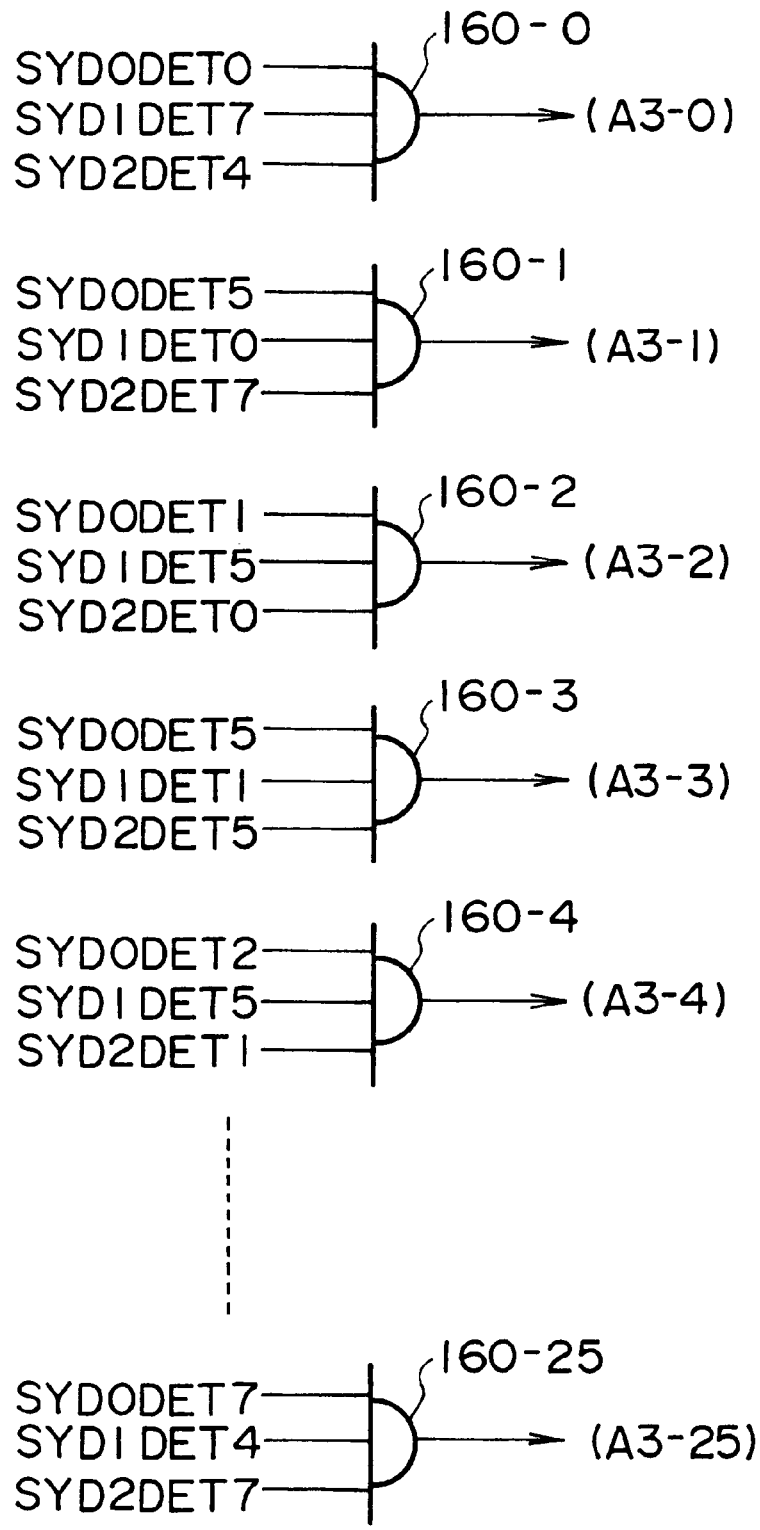
FIG. 14 is a diagram showing a typical construction of the consecutive match detecting circuit 55 shown in FIG. 10.

FIG. 14 shows a typical construction of a circuit integrated in the consecutive match detecting circuit 55 shown in FIG. 10 which detects a part where three consecutive sync signals are identical.

The circuit which detects a part where three consecutive sync signals are identical, comprises AND circuits 160-0 to 160-25 having three input terminals. One of the signals output by each of the sync signal match detecting circuits 50 to 52 shown in FIG. 10 is selected and input to the AND circuits 160-0 to 160-25.

In this case too, as in FIG. 13, signals are combined and input based on the arrangement of sync patterns in the sector. For example, signals SYD0DET0, SYD1DET7 and SYD2DET4 are input from the sync signal match detecting circuits 50 to 52 to the AND circuit 160-0. In this case, when the sync pattern SY0 is currently being read from the frame with frame number 0 in a given sector, and the sync patterns SY4, SY7 were respectively read two occasions beforehand and on the immediately preceding occasion from frames with frame numbers 24, 25 in the immediately preceding sector, the state of all signals is "1", so the output signal A3-0 from the AND circuit 160-0 is also "1". Also when for example all the sync signals SY7, SY4, SY7 are correctly read from the frames with frame numbers 23, 24 and 25, the AND circuit 160-25 outputs "1".

Figure 15:
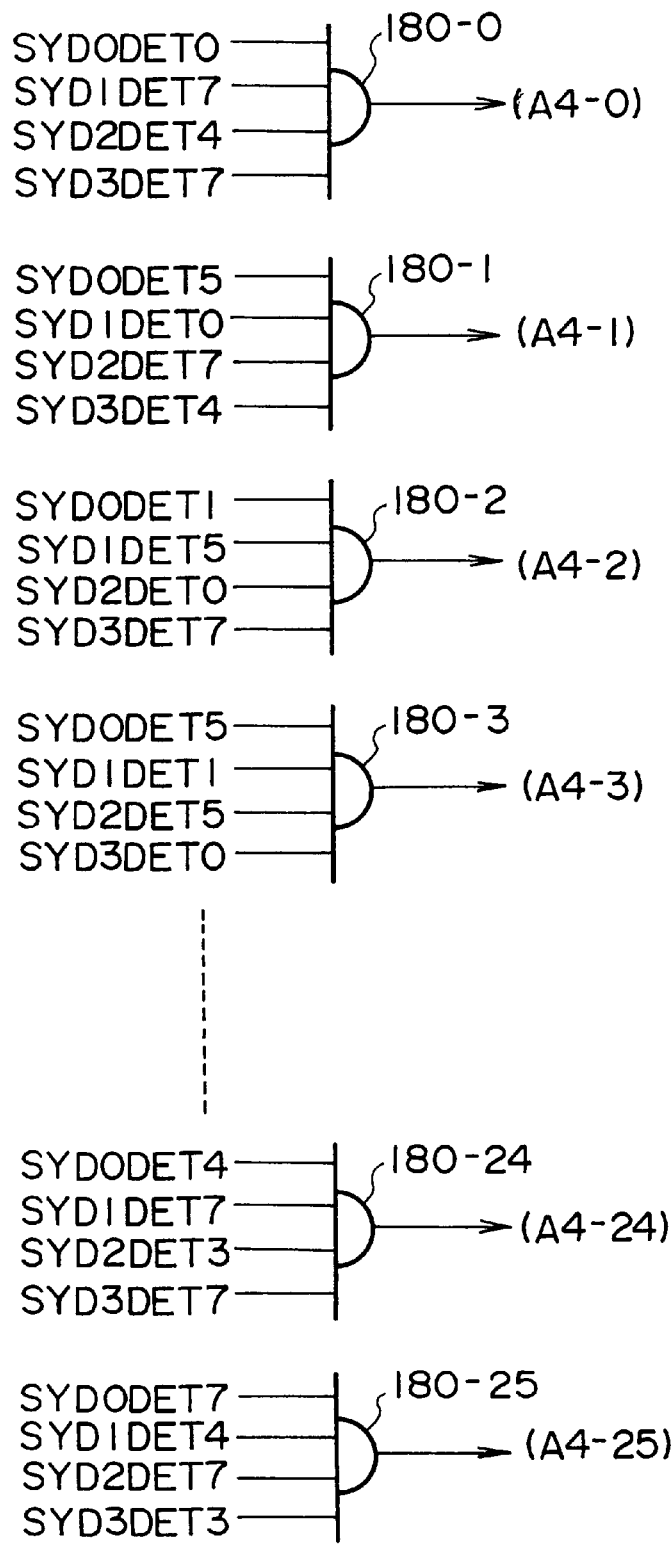
FIG. 15 is a diagram showing a typical construction of the consecutive match detecting circuit 55 shown in FIG. 10.

FIG. 15 shows a typical construction of a circuit integrated in the consecutive match detecting circuit 55 shown in FIG. 10 which detects a part where four consecutive sync signals are identical.

The circuit which detects a part where four consecutive sync signals are identical, comprises AND circuits 180-0 to 180-25 having four input terminals. One of the signals output by each of the sync signal match detecting circuits 50 to 52 shown in FIG. 10 is selected and input to the AND circuits 180-0 to 180-25.

As in the aforesaid case, the signal combinations input to these AND circuits 180-0 to 180-25 are based on four consecutive frame sync patterns in the sector.

FIG. 16 is a block diagram showing a typical construction of a circuit integrated in the consecutive match detecting circuit 55 shown in FIG. 10 which detects the preamble part.

The arrangement of sync patterns in the preamble part shown in FIG. 4 is different from that in the data part, and due to this difference of arrangement, the preamble part can be easily detected. For example, consider the case where two consecutive sync patterns are arbitrarily selected from the preamble part and the data part. Even numbered frames in the data part contain the sync patterns SY5 to SY7 not found in the preamble part. Therefore, as two consecutive sync patterns selected from the data part must necessarily contain one of the sync patterns SY5 to SY7 (and as the data read from the preamble part is a combination of one of the sync patterns SY1 to SY4), it is possible to determine whether the part currently being read is the preamble part or the data part.

According to this example, it is determined that the part being read is the preamble part when any of the sync patterns SY1 to SY4 is consecutively detected.

Figure 16A:
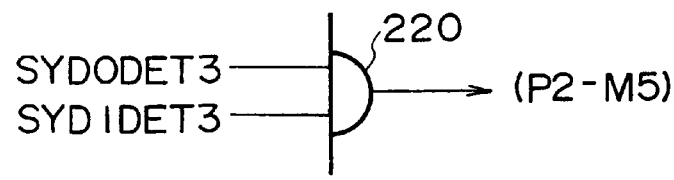
FIGS. 16A to 16E are diagrams showing a typical construction of a circuit for detecting a preamble part applying this invention.

The circuit which detects the preamble part comprises the AND circuits 220 to 224 (preamble part specifying means, preamble part specifying step). FIG. 16A is a circuit for detecting the sync pattern SY3 contained in each of two frames in the second row of the preamble part. Specifically, the signals SYD0DET3 and SYD1DET3 respectively output by the sync signal match detecting circuits 50, 51 shown in FIG. 10, are input to the AND circuit 220, and when these signals are both "1" (i.e. when the 2nd SY3 in the second row of the preamble part is currently being detected and the 1st SY3 was detected on the immediately preceding occasion), its output signal P2-M5 is "1".

Figure 16B:
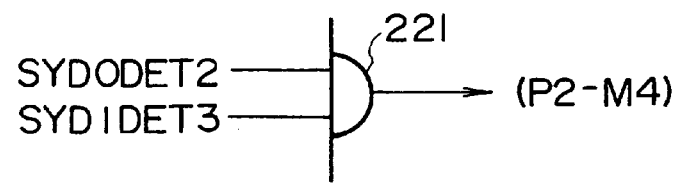
Figure 16C:
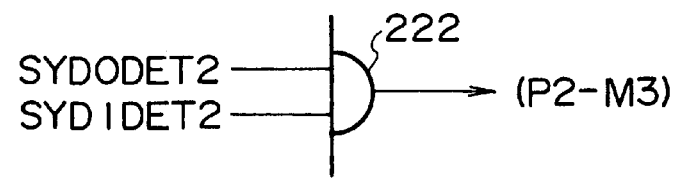
Figure 16D:
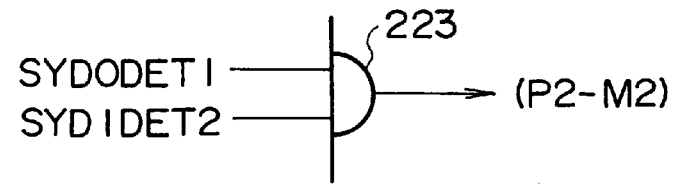
Figure 16E:
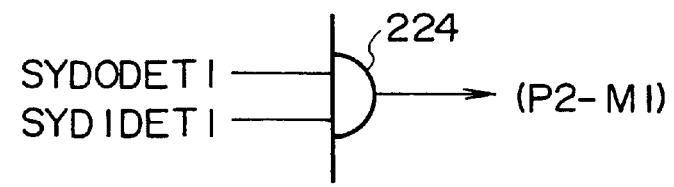

When SY3 is detected in the 2nd frame of the 2nd row and SY2 is detected in the 1st frame of the 3rd row of the preamble part, the output signal P2-M4 from the circuit shown in FIG. 16B is "1". When SY2 is detected in the 1st and 2nd frames of the 3rd row of the preamble part, the output signal P2-M3 from the circuit shown in FIG. 16C is "1". When SY1 is detected in the 2nd frame of the 3rd row and SY1 is detected in the 1st frame of the 4th row of the preamble part, the output signal P2-M3 from the circuit shown in FIG. 16D is "1". Further, when SY1 is detected in both the 1st and 2nd frames of the 4th row of the preamble part, the output signal P2-M1 from the circuit shown in FIG. 16E is "1".

The "2" in the output signals P2-M1 to M5 signifies a signal output when sync patterns are detected on two consecutive occasions, and "M" signifies minus.

The signals A2-y to A4-y, B4-y (described hereafter) and P2-z output by the consecutive match detecting circuit 55 shown in FIG. 10 having the aforesaid internal construction, are supplied to the sequencer 35 integrated in the sync signal identifying circuit 34 shown in FIG. 8, and the frame number of the frame currently being read is detected by performing predetermined processing shown below.

Figures 17, 17A:
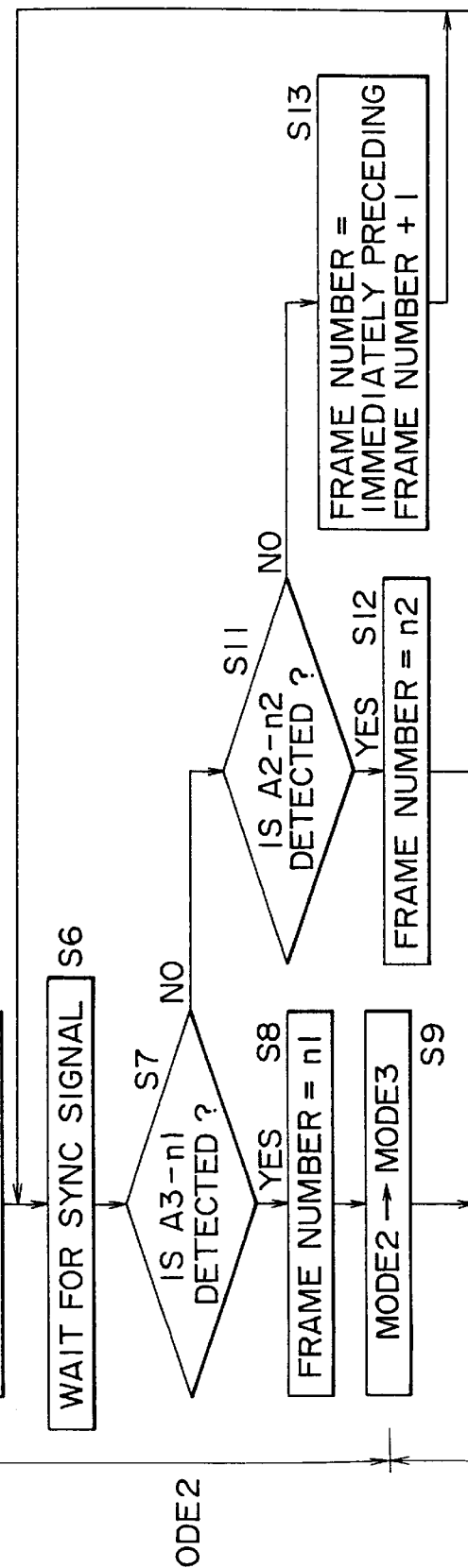

FIG. 17 is a flowchart describing one example of the processing performed by the sequencer 35. This process is executed when any output of the circuits which detect the preamble part shown in FIG. 16, is "1" (i.e. when any of the signals P2-z is "1").

In a step S1, the sequencer 35 sets the operating mode to the standby (STBY) mode. In other words, all the signals A2-y to A4-y output by the circuits shown in FIG. 13 to 15 are accepted as valid. The routine then proceeds to a step S2, and after waiting for a sync signal to be read, the routine proceeds to a step S3 where it is determined whether or not any of the signals A2-y (y=0, 1, . . . , 25) for detecting a part where two consecutive sync signals are identical, is "1". As a result when it is determined that any of the signals A2-y is "1" (yes) the y of the detected signal is stored in a parameter n0, the routine proceeds to a step S4, alternatively when it is determined that no such signal is detected (no), the routine returns to the step S2 and the above processing is repeated.

In the step S4 the frame number is set to n0, the demodulator 12 shown in FIG. 1 stores the reproduced data in a predetermined area of the SRAM 13 referring to this frame number. and the routine proceeds to a step S5. In the step S5, the sequencer 35 updates the operating mode from STBY to MODE2, i.e. all the signals A2-y to A4-y are accepted as valid, and the routine proceeds to a step S6.

In the step S6, after waiting for a sync signal to be read, the routine proceeds to a step S7, and the sequencer 35 determines whether or not any of the signals A3-y (y=0,1, . . . ,25), is "1". When as a result it is determined that none of the signals A3-y is "1" (no), the routine proceeds to a step S11.

In the step S11, it is determined whether or not any of the signals A2-y (y=0,1, . . . ,25) is "1". When as a result it is determined that any of the signals A2-y is "1" (yes), y is substituted in the parameter n2, the routine proceeds to a step S12, and after setting the frame number to n2, the routine returns to the step s6 where the same processing is repeated. When it is determined that none of the signals A2-y is "1" (no), the routine proceeds to a step S13. In the step S13, the frame number is incremented by 1, the routine returns to the step S6 and the same processing is repeated.

In the step S7, when it is determined that any of the signals A3-y is "1" (yes), the value of y is substituted in a parameter n1, the routine proceeds to a step S6, and the frame number is set to n1. By referring to this frame number n1, the demodulator 12 stores the playback data in a predetermined area of the SRAM13, and the routine proceeds to a step S9. In the step S9, the sequencer 35 changes the operating mode from MODE2 to MODE3. As a result, only the signals A3-y and A4-y are valid, and the signals A2-y are ignored. The routine then proceeds to a step S14.

In the step S14, after waiting for a sync signal to be read, the routine proceeds to a step S15. In the step S15, it is determined whether or not any of the signals A4-y is "1". When as a result it is determined that none of the signals A4-y is "1" (no), the routine proceeds to a step S18, and it is determined whether or not any of the signals A3-y is "1". When as a result it is determined that one of the signals A3-y is "1" (yes), the value of y is substituted in the parameter n4, the routine proceeds to a step S19, and after setting the frame number to n4, the routine returns to the step S14. When on the other hand it is determined in the step S18 that none of the signals A3-y is "1" (no), the routine proceeds to a step S20. In the step S20, after the frame number is incremented by 1, the routine returns to the step S14 and the same processing is repeated.

When in the step S15 it is determined that one of the signals A4-y is "1" (yes), the value of y is substituted in n3, the routine proceeds to a step S16, and the frame number is set to n3. By referring to this frame number n3, the demodulator 12 stores the data currently being played back in a predetermined area of the SRAM13 and the routine proceeds to a step S17.

In the step S17, the sequencer 35 changes the operating mode from MODE3 to MODE4. As a result, only the signals A4-y are valid and the signals A2-y and A3-y are ignored. The routine then proceeds to a step S21.

In the step S21, after waiting for a sync signal to be read, the routine proceeds to a step S22. In the step S22, it is determined whether or not any of the signals A4-y is "1". When as a result it is determined that one of the signals A4-y is "1" (yes), the value of y is substituted in n5, the routine proceeds to a step S23, and the frame number is set to n5. By referring to this frame number n5, the demodulator 12 stores playback data in a predetermined area of the SRAM 13. The routine then returns to the step S21, and the same processing is repeated. When on the other hand it is determined that none of the signals A4-y is "1" (no), the routine proceeds to a step S24, and after the frame number is incremented by 1, the routine returns to the step S21 and the same processing is repeated.

According to the aforesaid processing, after the preamble part is detected by the circuit shown in FIGS. 16A to 16E, the frame number is identified from the regularity of sync patterns inserted in block data, and the data is stored in a predetermined area of the SRAM 13 according to the identified block number. The data part can therefore rapidly be identified, and one block of data can be accurately extracted.

According to the aforesaid example, the sync patterns contained in the postamble part were all SY4, however other arrangements are also possible. The preamble part is an area for making various preparations to read data (such as pulling in a PLL, etc.), and its position must be detected as soon as possible. On the other hand, the postamble part is used for establishing the point at which data ends and is used mainly as an overlap, so it should be so arranged that it can be easily distinguished from the data part.

Next, a typical construction of another example of this invention will be described.

Figure 18:
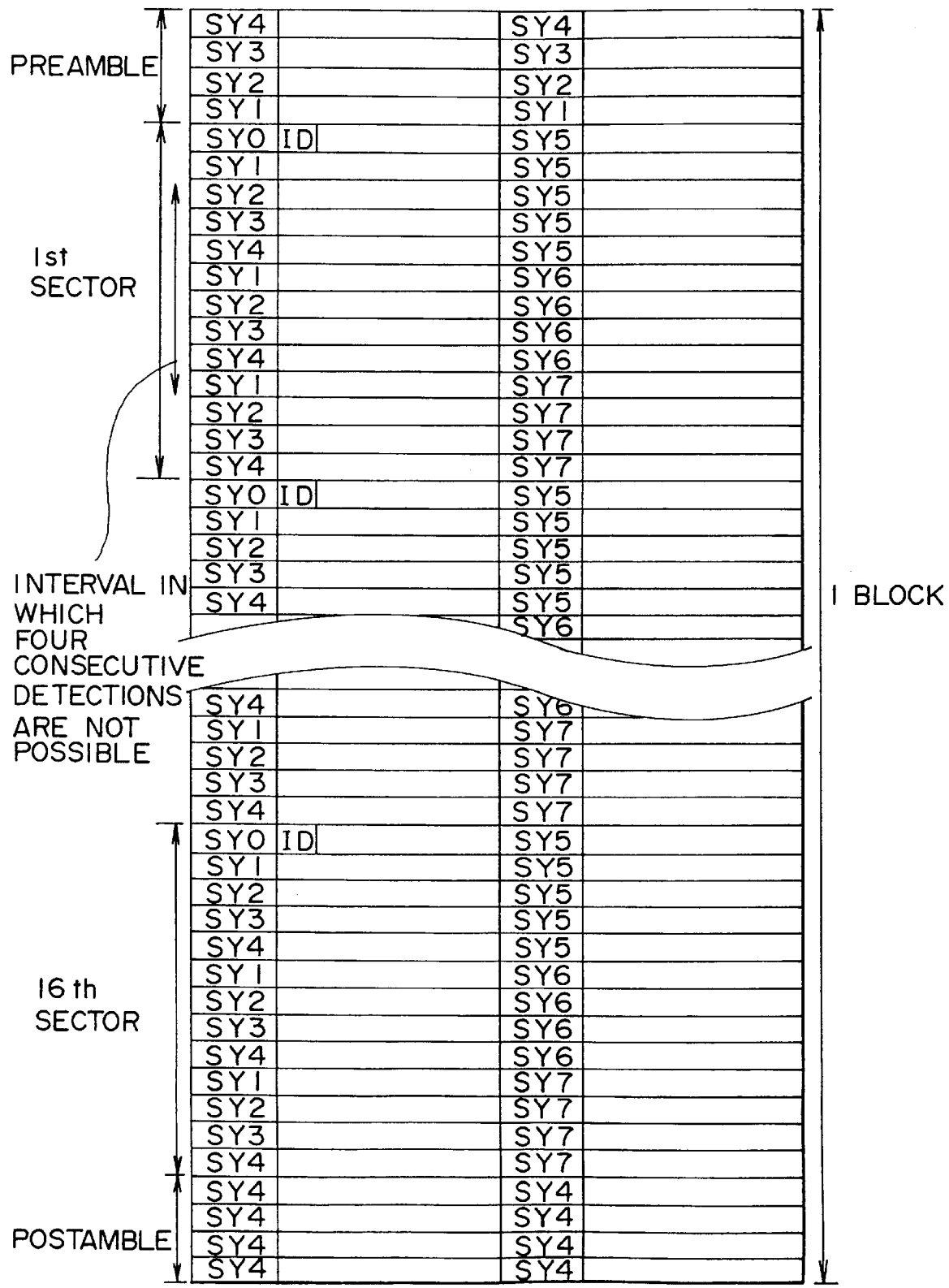
FIG. 18 is a diagram showing one block of data when there is a sync pattern which cannot be reproduced due to a scratch or the like on the optical disk 10.

For example, when playback of the 1st frame in the 3rd, 5th, 7th and 9th rows of the 1st sector is impossible due to a scratch or dust on the optical disk 10, four consecutive sync blocks can no longer be detected, and as a result the signals A4-y are all "0". Therefore using the processing shown in FIG. 17, in MODE4 (steps S21 to S23), the frame numbers in this interval (interval wherein the four consecutive detections shown in FIG. 18 is impossible) cannot be accurately identified.

In this regard, according to the following example whereof the construction and processing are described below, incorrect detection of frame numbers may be prevented even in such a case.

FIG. 19 shows a typical construction of a part integrated in the consecutive match detecting circuit 55 shown in FIG. 10 (part which generates the signals B4-y) for detecting four consecutive sync signals.

As shown in FIG. 19, the part which detects whether or not the four consecutive sync signals match comprises AND circuits 200-0 to 200-25 having four terminals. Signals output by the sync signal match detecting circuits 50, 51, 53, 54 shown in FIG. 10 are combined in a predetermined area and input to the AND circuits 200-0 to 200-25. For example, SYD0DET0, SYD1DET7, SYD3DET7 and STD4DET3 which are respectively output by the sync signal match detecting circuits 50, 51, 53, 54 are input to the AND 200-0, therefore when all of these signals are "1", the signal B4-0 output by the AND circuit 200-0 is "1".

The signals B4-y (y=0, 1, . . . ,25) are "1" when the following four sync signal shave a predetermined pattern.

Figure 20B:
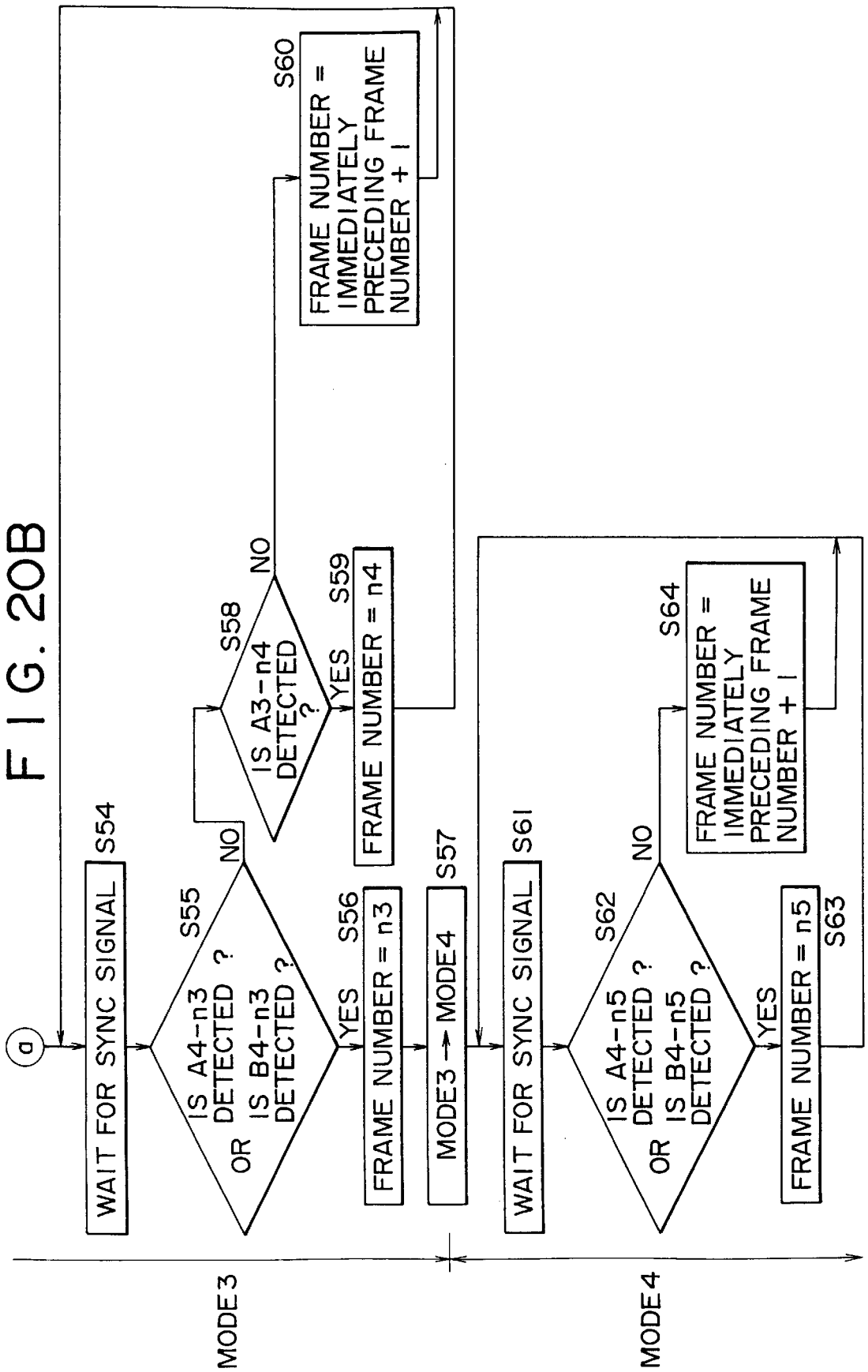

(1) Sync signal currently being reproduced
(2) Sync signal reproduced on immediately preceding occasion
(3) Sync signal reproduced three occasions previously
(4) Sync signal reproduced four occasions previously Next, an example of the processing performed when the aforesaid B4-y signals are used will be described with reference to FIG. 20.

As in the case of the processing shown in FIG. 17, this processing is performed when any of the outputs (P2-y) of the circuits for detecting the preamble part shown in FIG. 16 are "1'.

When this processing is performed, in a step S40, the sequencer 35 integrated in the sync signal determining circuit 34 shown in FIG. 8 changes the operating mode to standby (STBY). In other words, the sequencer 35 accepts all the signals A2-y to A4-y and B4-y output by the consecutive match detecting circuit 55 shown in FIG. 10 as valid. The routine then proceeds to a step S41, and after waiting for a sync signal to be read, the routine proceeds to a step S42 and it is determined whether or not any of the signals A2-y is "1". When as a result it is determined that none of the signals A2-y is "1" (no), the routine returns to the step S41 and the same processing is repeated. When it is determined that one of the signals A2-y is "1" (yes), the value of y is substituted in the parameter n0 and the routine proceeds to a step S43.

In the step S43, the frame number is set to n0. By referring to this frame number, the demodulator 12 shown in FIG. 1 stores the reproduced data in a predetermined area of the SRAM 13, and the routine then proceeds to a step S44.

In the step S44, the sequencer 35 changes the operating mode from STBY to MODE2, i.e. all the signals A2-y to A4-y and B4-y are accepted as valid, and the routine proceeds to a step S45.

In the step S45, after waiting for a sync signal to be read, the routine proceeds to a step S46. In the step S46, it is determined whether or not any of the signals A3-y is "1", i.e. it is determined whether or not any of the outputs of the AND circuits shown in FIG. 14 is "1". When as a result none of the signals A3-y is "1" (no), the routine proceeds to a step S48. In the step S48, it is determined whether or not any of the signals B4-y is "1", and when as a result it is determined that one of the signals B4-y is "1" (yes), the value of y is substituted in n6, the routine proceeds to a step S49, and the frame number is set to n6. The demodulator 12 shown in FIG. 1 stores the reproduced data in a predetermined area of the SRAM 13 according to the frame number n6, and the routine then proceeds to a step S53.

In the step S48, when it is determined that none of the signals B4-y is "1" (no), the routine proceeds to a step S50. In the step S50, it is determined whether or not any of the signals A2-y is "1". When as a result it is determined that one of the signals A2-y is "1" (yes), the value of y is substituted in n2, the routine proceeds to a step S51, and the frame number is set to n2. The demodulator 12 shown in FIG. 1 stores playback data in a predetermined area of the SRAM 13 according to the value of this frame number n2. The routine then returns to the step S45 and the same processing is repeated. When on the other hand it is determined in the step S50 that none of the signals A2-y is "1" (no), the routine proceeds to a step S52, and after the frame number is incremented by 1, the routine returns to the step S45 and the same processing is repeated.

In the step S46, when it is determined that any of the signals A3-y is "1" (yes), the value of y is substituted in a parameter n1, the routine proceeds to a step S47, and the frame number is set to n1. By referring to this frame number n1, the demodulator 12 shown in FIG. 1 stores the playback data in a predetermined area of the SRAM 13, and the routine proceeds to a step S53.

In the step S53, the sequencer 35 changes the operating mode from MODE2 to MODE3. Hence the signals A3-y, A4-y and B4-y are valid, and the signals A2-y are ignored. The routine then proceeds to a step S54, and after waiting for a sync signal to be read, the routine proceeds to a step S55.

In the step S55, it is determined whether or not any of the signals A4-y or B4-y is "1". When as a result it is determined that none of the signals A4-y or B4-y is "1" (no), the routine proceeds to a step S58. In the step S58, it is determined whether or not any of the signals A3-y is "1". When as a result it is determined that one of these signals is "1" (yes), the value of y is substituted in the parameter n4, the routine proceeds to a step S59, and the frame number is set to n4. By referring to the frame number n4, the demodulator 12 shown in FIG. 1 stores the playback data in a predetermined area of the SRAM 13, the routine returns to the step S54, and the same processing is repeated. When on the other hand it is determined in the step S58 that none of the signals A3-y is "1" (no), the routine proceeds to a step S60, the frame number is incremented by 1, the routine returns to the step S54 and the same processing is repeated.

When in the step S55 it is determined that one of the signals A4-y or B4-y is "1" (yes), the value of y is substituted in n3, the routine proceeds to a step S56, and the frame number is set to n3. By referring to this frame number n3, the demodulator 12 shown in FIG. 1 stores the data currently being played back in a predetermined area of the SRAM 13. The routine then proceeds to a step S57.

In the step S57, the sequencer 35 changes the operating mode from MODE3 to MODE4. As a result, only the signals A4-y are accepted as valid. The routine then proceeds to a step S61.

In the step S61, after waiting for a sync signal to be read, the routine proceeds to a step S62. In the step S62, it is determined whether or not any of the signals A4-y or B4-y is "1". When as a result it is determined that one of the signals A4-y or B4-y is "1" (yes), the value of y is substituted in n5, the routine proceeds to a step S63, and the frame number is set to n5. The demodulator 12 shown in FIG. 1 stores playback data in a predetermined area of the SRAM 13 according to this frame number n5. The routine then returns to the step S61, and the same processing is repeated.

In the step S62, when on the other hand it is determined that none of the signals A4-y or B4-y is "1" (no), the routine proceeds to a step S64, and after the frame number is incremented by 1, the routine returns to the step S61 and the same processing is repeated.

According to the aforesaid construction, as shown in FIG. 18, the preamble part maybe detected and the frame number of the data part identified even when there is a sync pattern which cannot be reproduced. Hence even when there is a scratch or dust on the optical disk 10, blocks can be accurately extracted, and data can be accurately stored in a predetermined area of the SRAM 13. Error correction can therefore be accurately performed, and the data recorded on the optical disk 10 can be faithfully reproduced.

According to the aforesaid examples, the B4-y signals were generated from sync signals other than the sync signal reproduced two occasions previously (sync signals reproduced currently, on the immediately preceding occasion, three occasions previously and four occasions previously), but the invention is not limited to this case. For example, the B4-y signals may be generated by sync signals other than that reproduced on the immediately preceding occasion, and the number of sync signals used may also be varied.

In the processing of the steps S55, S62, A4-y and B4-y were identified in the same step, however they may be identified by separate steps as shown by S46 and S48.

As described hereabove, the preamble part is given a different arrangement of sync patterns to that of the data part (1st to 16th sector), so the header of the data part may be detected from the sync patterns in the preamble part. The construction of a circuit which identifies the 1st sector from the sync patterns of the preamble part, and the processing it performs, will now be described.

FIGS. 21A to 21I are circuits for detecting the frame with frame number 0 in the 1st sector. FIGS. 21A to 21C are circuits from which the respective output signals Q2-0A to Q2-0C are "1" when the sync pattern SY0 in the 1st frame of the 1st sector (frame with frame number 0), and the 2nd, 3rd and 4th sync patterns from the end of the preamble part (respectively SY1, SY2, SY2) are detected.

FIGS. 21D to 21F are circuits from which the respective output signals Q2-0D to Q2-0F are "1" when the last sync pattern SY1 in the preamble part is detected on the immediately preceding occasion, and the 2nd, 3rd and 4th sync patterns from the end (respectively SY1, SY2, SY2) are detected two occasions, three occasions and four occasions previously.

FIGS. 21G and 21H are circuits from which the respective output signals Q2-0G to Q2-0H are "1" when the 2nd sync pattern SY1 from the end of the preamble part is detected two occasions previously, and the 3rd and 4th sync patterns from the end (together with SY2) are detected three occasions and four occasions previously.

FIG. 21I is a circuit from which the output signal Q2-0I is "1' when the 3rd sync pattern SY2 from the end of the preamble part is detected three occasions previously, and the 4th SY2 from the end is detected four occasions previously.

Next, a typical process will be described for detecting the frame with frame number 0 in the 1st sector using the aforesaid example.

Figure 22A:
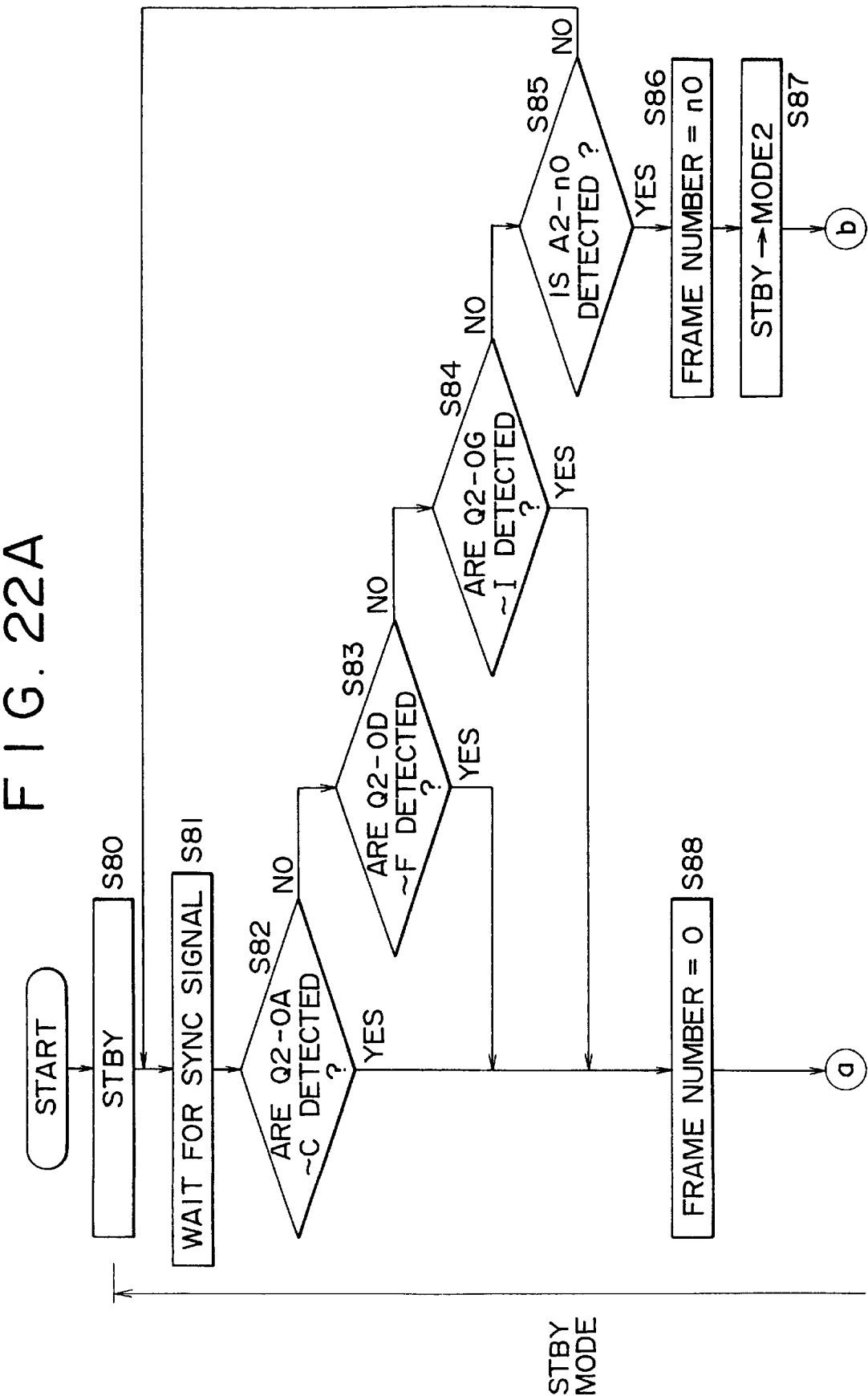

FIG. 22 is a flowchart describing typical processing for detecting the frame with frame number 0 in the 1st sector using the example shown in FIG. 21. This processing is performed when any of the outputs (P2-z) from the circuits shown in FIGS. 16A to 16E is "1" (i.e. when the preamble part is detected).

When any of the output signals in FIGS. 16A to 16E is "1", the sequencer 35 shifts to the standby (STBY) mode in a step S80. In other words, all the signals Q2-0A to Q2-0I shown in FIGS. 21A to 21I are accepted as valid.

In a following step S81, the sequencer 35 waits for a sync signal to be read, the routine proceeds to a step S82. In the step S82, it is determined whether or not any of the signals Q2-0A to Q2-0C from the circuits shown in FIGS. 21A to 21C is "1". When as a result it is determined that any of the signals Q2-0A to Q2-0C is "1" (yes), the routine proceeds to a step S88. Conversely when it is determined that none of these signals is "1" (no), the routine proceeds to a step S83.

In the step S83, it is determined whether or not any of the output signals Q2-0D to Q2-0F from the circuits shown in FIG. 21D to 21F is "1". When as a result it is determined that one of these signals is "1" (yes), the routine proceeds to a step S88. On the other hand when it is determined in the step S88 that none of these signals is "1" (no), the routine proceeds to a step S84.

In the step S84, it is determined whether or not any of the output signals Q2-0G to Q2-0I from the circuits shown in FIG. 21G to 21I is "1". When as a result it is determined that none of these signals is "1" (no), the routine proceeds to a step S85.

In the step S85, it is determined whether or not any of the signals A2-y output by the circuits shown in FIG. 13 is "1". When as a result it is determined that none of these signals is "1" (no), the routine returns to the step S81 and the same processing is repeated. On the other hand when it is determined that one of these signals is "1" (yes), the value of y is substituted in the parameter n0 and the routine proceeds to a step S86.

In the step S86, the frame number is set to n0. By referring to this frame number n0, the demodulator 12 shown in FIG. 1 stores playback data in a predetermined area of the SRAM 13. The routine then returns to the step S87, and the sequencer 35 changes the operating mode from standby to MODE2, i.e. the sequencer 35 accepts all of the signals A2-y to A4-y as valid. The routine then proceeds to the step S45 shown in FIG. 20, and the processing of MODE2 is performed. The subsequent processing is the same as that described hereabove.

When the result of any of the steps S82 to S84 is "yes", the routine proceeds to a step S88, and the frame number is set to 0. The demodulator 12 shown in FIG. 1 then determines that the leading frame (frame number 0) in the 1st sector is currently being played back, and the data which is subsequently reproduced is sequentially stored in a predetermined area of the SRAM 13.

In the following step S89, after waiting for a sync signal to be read, the routine proceeds to a step S90. In the step S90, it is determined whether or not any of the signals A2-y output by the circuit shown in FIG. 13 is "1". When as a result it is determined that none of the signals A4-y is "1" (no), the routine proceeds to a step S93, the frame number is incremented by 1, the routine returns to the step S89 and the same processing is repeated. When on the other hand it is determined that one of the signals A2-y is "1" (yes), the value of y is substituted in the parameter n0, the routine proceeds to a step S91, and the frame number is set to n0.

When the processing result of the steps S82 to S84 is "yes", the leading frame of the 1st sector (frame number 0) is detected, so normally n0=1, i.e. the frame number is set to 1.

In the step S92, the sequencer 35 changes the operating mode from STBY to MODE2. As a result, all the signals A2-y to A4-y are accepted as valid. The routine then proceeds to the step S45 shown in FIG. 20 and shifts to the processing of MODE2.

When the 1st frame in the 1st sector (frame with frame number 0) fails to be detected in the step S82 to S84, the frame number in the sector is detected. This is in order to enable data to be correctly stored in the SRAM 13 based on the frame number which is first detected in subsequent processing even when detection of the 1st frame in the 1st sector has failed.

The shift to the STBY mode in the step S80 is performed when any of the signals Q2-0A to Q2-0I for detecting the 1st frame in the 1st sector are "1". It is also forced when playback of the last frame in a block (last frame in 16 sectors) has been completed.

According to the above construction, the preamble part was detected and the leader of the data part was subsequently detected, hence the frames in the data part may be identified and each frame may be identified even more precisely.

FIGS. 23A to 23D are diagrams showing another typical arrangement of sync patterns in the preamble part.

In the example of FIG. 23A, the sync patterns SY4, SY2, SY1, SY3 are arranged in pairs and in sequence in the frames of the 1st to 4th rows in the preamble part.

In the example of FIG. 23B, the sync patterns SY4, SY1, SY3, SY2 are arranged in pairs and in sequence in the frames of the 1st to 4th rows in the preamble part.

In the example of FIG. 23C, the sync patterns SY3, SY2, SY1, SY4 are arranged in pairs and in sequence in the frames of the 1st to 4th rows in the preamble part.

In the example of FIG. 23D, the sync patterns SY4, SY3 are arranged in the frame in the 1st row of the preamble part, the sync patterns SY2, SY1 are arranged in the frame in the 2nd row, SY1, SY2 are arranged in the frame in the 3rd row, and SY3, SY4 are arranged in the frame in the 4th row.

Also according to these examples, when two consecutive sync patterns are arbitrarily selected, the combinations of selected syncpatterns are different from the data arbitrarily selected from the data part, so the preamble part may be easily detected.

According to the above examples, two consecutive sync patterns were detected, and the preamble part was detected from combinations of these patterns, but three or more sync patterns may also be detected.

For example, when three sync patterns are detected and the 2nd sync pattern contains an error, it must be determined from the 1st and 3rd sync patterns whether or not the part currently being read is the preamble part. According to this example this case is also considered to determine the arrangement of sync patterns in the preamble part.

In other words, three consecutive sync patterns are read from the preamble part, and when the 2nd sync pattern contains an error which renders it uncertain (i.e. when two sync patterns are read alternately), it is still possible to distinguish these patterns from the sync patterns of the data part. Hence even in such a case, the preamble part can be detected.

As an example, in the case shown in FIG. 18, two sync patterns SY4 in the 1st row and the sync pattern SY3 in the 1st frame of the 2nd row of the preamble part are detected, and when the sync pattern in the 2nd column contains an error rendering it uncertain, the detected sync patterns are SY4, uncertain, SY3. However as this combination does not exist in the data part, the preamble part can still be detected even in this case. This is also true in the case of the example shown in FIG. 23.

The above examples were described in the case of an optical disk which could be rewritten or updated as recording medium, however it will be understood that this invention is not limited to this case, and may be applied to any recording medium having a data format comprising a preamble part.

This invention may of course also be applied to a recording medium comprising a preamble part intended exclusively for playback, such as a DVD (Digital Versatile Disk).

It should be understood that various alternatives to the embodiments of the invention described herein may be employed in practicing the invention. It is intended that the following claims define the scope of the invention and that structures within the scope of these claims and their equivalents are covered thereby.

What is claimed is:

1. A recording medium configured to have recorded thereon and have reproduced therefrom blocks of information, said recording medium comprising:
    a plurality of data each having a predetermined length;
    a first plurality of sync patterns;
    a plurality of frames including said plurality of data and said first plurality of sync patterns;
    a plurality of data parts including said plurality of frames; and
    a plurality of blocks, each block including one of said plurality of data parts and a second plurality of sync patterns;
    wherein for each block, said second plurality of sync patterns are added thereto such that a first beginning sync pattern and a first ending sync pattern of a quantity of consecutive sync patterns arbitrarily selected from said one of said plurality of data parts are mutually distinct from a second beginning sync pattern and a second ending sync pattern of the same quantity of consecutive sync patterns arbitrarily selected from said second plurality of sync patterns.

2. The recording medium of claim 1, wherein said quantity of consecutive sync patterns is two.

3. The recording medium of claim 1, wherein said quantity of consecutive sync patterns is three.

4. A recording medium playback device for playing back a recording medium, said recording medium including a plurality of data each having a predetermined length, a first plurality of sync patterns, a plurality of frames having said plurality of data and said first plurality of sync patterns, a plurality of data parts having said plurality of frames, and a plurality of blocks, each block having one of said plurality of data parts and a second plurality of sync patterns, said playback device comprising:
    detecting means for detecting said first plurality of sync patterns and said second plurality of sync patterns; and
    identifying means for identifying said second plurality of sync patterns from a beginning sync pattern and an ending sync pattern of a quantity of consecutive sync patterns detected by said detecting means.

5. The playback device of claim 4, wherein said quantity of consecutive sync patterns is two.

6. The playback device of claim 4, wherein said quantity of consecutive sync patterns is three.

7. A recording medium playback method for playing back a recording medium, said recording medium including a plurality of data each having a predetermined length, a first plurality of sync patterns, a plurality of frames having said plurality of data and said first plurality of sync patterns, a plurality of data parts having said plurality of frames, and a plurality of blocks, each block having one of said plurality of data parts and a second plurality of sync patterns, said playback method comprising the steps of:
    detecting said first plurality of sync patterns and said second plurality of sync patterns; and
    identifying said second plurality of sync patterns from a beginning sync pattern and an ending sync pattern of a quantity of consecutive sync patterns detected in said step of detecting.

8. The playback method of claim 7, wherein said quantity of consecutive sync patterns is two.

9. The playback method of claim 7, wherein said quantity of consecutive sync patterns is three.

10. A recording medium recording device for recording information on a recording medium, said information including a plurality of data each having a predetermined length, a first plurality of sync patterns, a plurality of frames having said plurality of data and said first plurality of sync patterns, a plurality of data parts having said plurality of frames, and a plurality of blocks, each block having one of said plurality of data parts and a second plurality of sync patterns, said recording device comprising:
    first sync pattern adding means for adding said first plurality of sync patterns in a predetermined sequence to said plurality of frames; and
    second sync pattern adding means for adding said second plurality of sync patterns to said each block such that a first beginning sync pattern and a first ending sync pattern of a quantity of consecutive sync patterns arbitrarily selected from said first plurality of sync patterns are different from a second beginning sync pattern and a second ending sync pattern of the same quantity of consecutive sync patterns arbitrarily selected from said second plurality of sync patterns.

11. The recording device of claim 10, wherein said quantity of consecutive sync patterns is two.

12. The recording device of claim 10, wherein said quantity of consecutive sync patterns is three.

13. A recording medium recording method for recording information on a recording medium, said information including a plurality of data each having a predetermined length, a first plurality of sync patterns, a plurality of frames having said plurality of data and said first plurality of sync patterns, a plurality of data parts having said plurality of frames, and a plurality of blocks, each block having one of said plurality of data parts and a second plurality of sync patterns, said recording method comprising the steps of:
    adding said first plurality of sync patterns in a predetermined sequence to said plurality of frames; and
    adding said second plurality of sync patterns to said each block such that a first beginning sync pattern and a first ending sync pattern of a quantity of consecutive sync patterns arbitrarily selected from said first plurality of sync patterns are different from a second beginning sync pattern and a second ending sync pattern of the same quantity of consecutive sync patterns arbitrarily selected from said second plurality of sync patterns.

14. The recording method of claim 13, wherein said quantity of consecutive sync patterns is two.

15. The recording method of claim 13, wherein said quantity of consecutive sync patterns is three.

* * * * *